(12) United States Patent
Tsunekawa et al.

(10) Patent No.: US 11,269,571 B2
(45) Date of Patent: Mar. 8, 2022

(54) INFORMATION PROCESSING APPARATUS, METHOD OF CONTROLLING THE SAME, AND MEDIUM

(71) Applicant: CANON KABUSHIKI KAISHA, Tokyo (JP)

(72) Inventors: Kiyohiro Tsunekawa, Kanagawa (JP); Minoru Fujisawa, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/199,821

(22) Filed: Mar. 12, 2021

(65) Prior Publication Data
US 2021/0286569 A1 Sep. 16, 2021

(30) Foreign Application Priority Data

Mar. 12, 2020 (JP) .............................. JP2020-043335
Dec. 8, 2020 (JP) .............................. JP2020-203657

(51) Int. Cl.
| | | |
|---|---|---|
| G06F 15/00 | (2006.01) | |
| G06F 3/12 | (2006.01) | |
| G06K 1/00 | (2006.01) | |
| H04N 1/00 | (2006.01) | |
| H04W 76/10 | (2018.01) | |
| H04W 52/02 | (2009.01) | |
| H04W 84/12 | (2009.01) | |

(52) U.S. Cl.
CPC .......... G06F 3/1236 (2013.01); G06F 3/1203 (2013.01); G06F 3/1292 (2013.01); H04N 1/00214 (2013.01); H04W 52/0209 (2013.01); H04W 76/10 (2018.02); H04W 84/12 (2013.01)

(58) Field of Classification Search
CPC .... G06F 3/1236; G06F 3/1203; G06F 3/1292; H04N 1/00214; H04W 76/10; H04W 52/0209; H04W 84/12
USPC ............................... 358/1.1, 1.15, 1.14, 1.13
See application file for complete search history.

(56) References Cited

U.S. PATENT DOCUMENTS

2011/0312278 A1* 12/2011 Matsushita ............ G08C 17/02
455/66.1
2013/0129354 A1* 5/2013 Tanaka ................ H04L 43/0811
398/66
2014/0279093 A1* 9/2014 McNally ............. H04M 3/4938
705/15

FOREIGN PATENT DOCUMENTS

JP 2018-195931 A 12/2018

* cited by examiner

*Primary Examiner* — Douglas Q Tran
(74) *Attorney, Agent, or Firm* — Venable LLP

(57) ABSTRACT

An information processing apparatus for transmitting device management information is provided. The apparatus includes a first communication unit to, in relation to an external apparatus, perform communication that uses an IP address; and a second communication unit to communicate with an external apparatus by a communication method different from a communication method used by the first communication unit; wherein a selection of either the first communication unit or the second communication unit as a communication unit used to transmit the device management information is received, and in a case where the second communication unit is selected as the communication unit, among a plurality of types of management information that can be transmitted to an external unit in a case where the first communication unit is selected, a subset of the types of management information can be transmitted to an external unit.

18 Claims, 16 Drawing Sheets

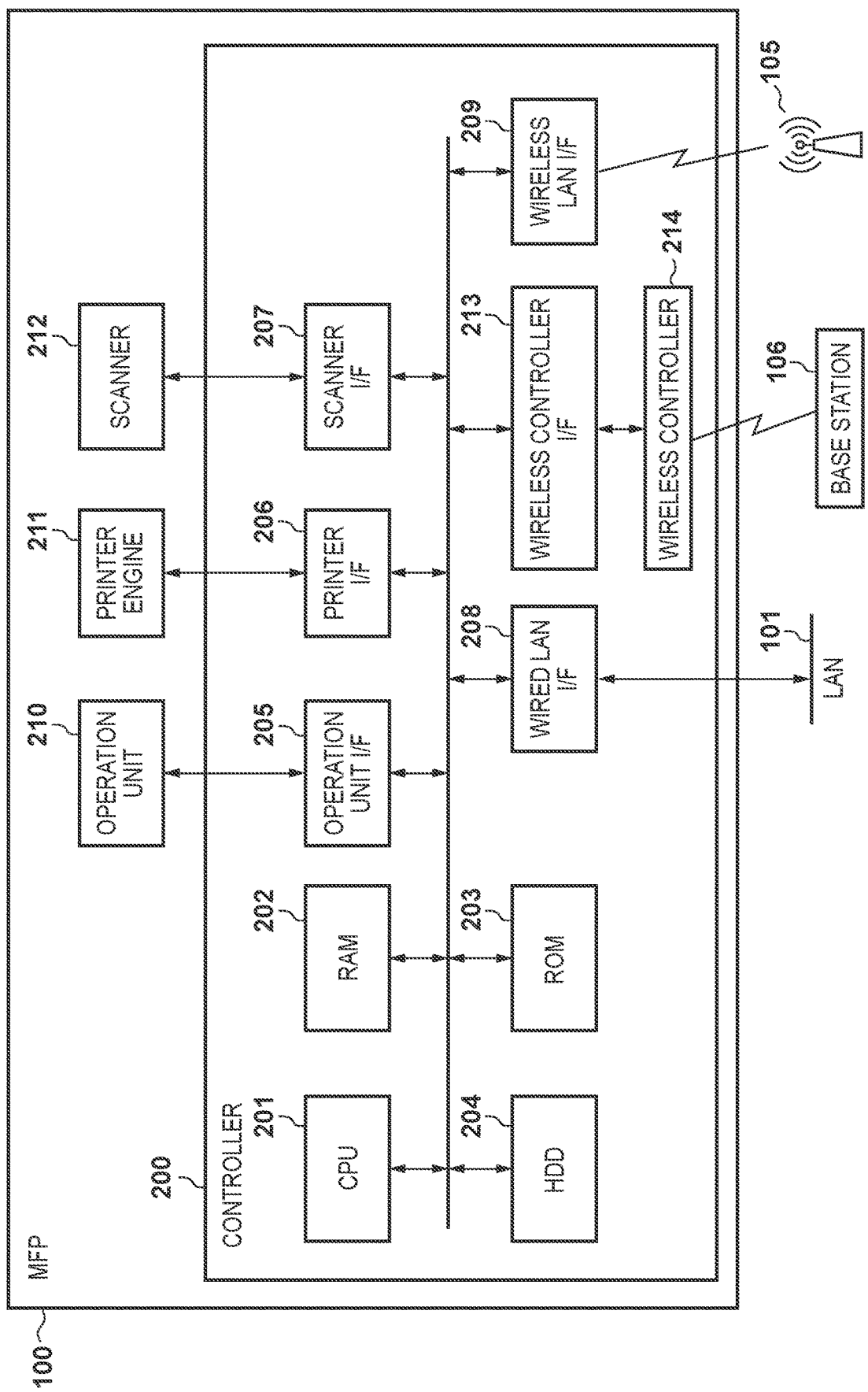

FIG. 10A

REMOTE MONITORING SERVICE SETTING

TRANSMISSION METHOD: 401 | HTTPS(MAIN LINE) | 402 | HTTPS(SUB LINE) | 403 | DEDICATED LINE (WIDE AREA WIRELESS)

TRANSMISSION DATA: 1001 | MAIN COUNTER | 1002 | LATEST STATUS | 1003 | REMAINING TONER AMOUNT

TRANSMISSION PERIOD: 1004 | 1 DAY | 1005 | 1 WEEK | 1006 | 1 MONTH

WHEN MAIN LINE OR SUB LINE IS SELECTED, SETTING CAN BE PERFORMED ON MANAGEMENT SERVER

405 CANCEL | 406 OK

REMOTE MONITORING SERVICE SETTING

TRANSMISSION METHOD:

| HTTPS(MAIN LINE) — 401 | HTTPS(SUB LINE) — 402 | DEDICATED LINE (WIDE AREA WIRELESS) — 403 |

TRANSMISSION DATA:

| MAIN COUNTER — 1001 | LATEST STATUS — 1002 | REMAINING TONER AMOUNT — 1003 |

TRANSMISSION PERIOD:

| 1 DAY — 1004 | 1 WEEK — 1005 | 1 MONTH — 1006 |

WHEN MAIN LINE OR SUB LINE IS SELECTED, SETTING CAN BE PERFORMED ON MANAGEMENT SERVER

| CANCEL — 405 | OK — 406 |

1000

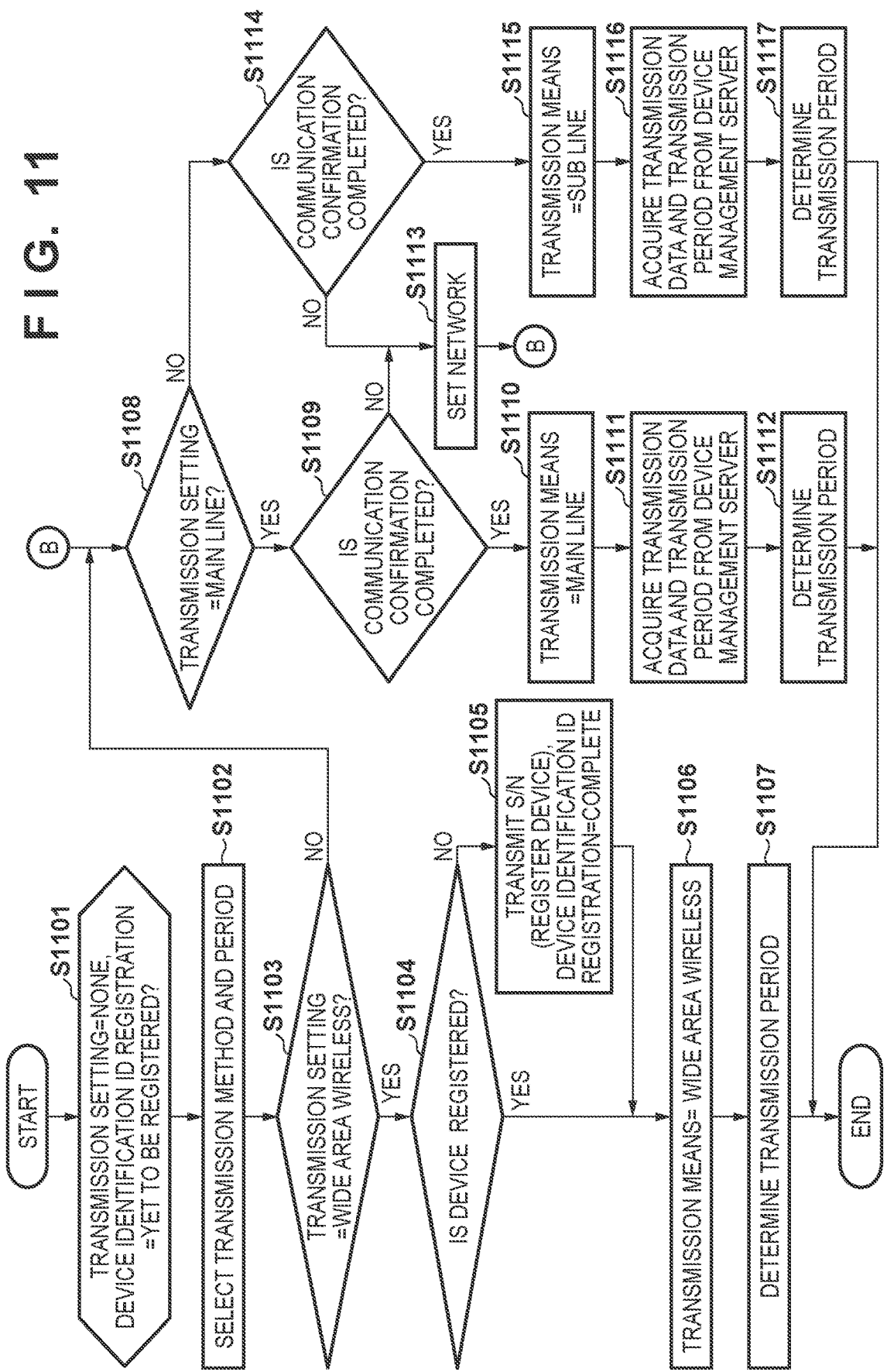

FIG. 12A

REMOTE MONITORING SERVICE SETTING — 1200

TRANSMISSION DATA: — 1201
- MAIN COUNTER
- LATEST STATUS — 1202
- REMAINING TONER AMOUNT — 1203

TRANSMISSION PERIOD: — 1204
- DETAILED COUNTER
- DETAILED STATUS — 1205
- CONSUMABLE INFORMATION — 1206

TRANSMISSION METHOD: — 1207
- HTTPS(MAIN LINE)
- HTTPS(SUB LINE) — 1208
- DEDICATED LINE (WIDE AREA WIRELESS) — 1209

CANCEL — 405
OK — 406

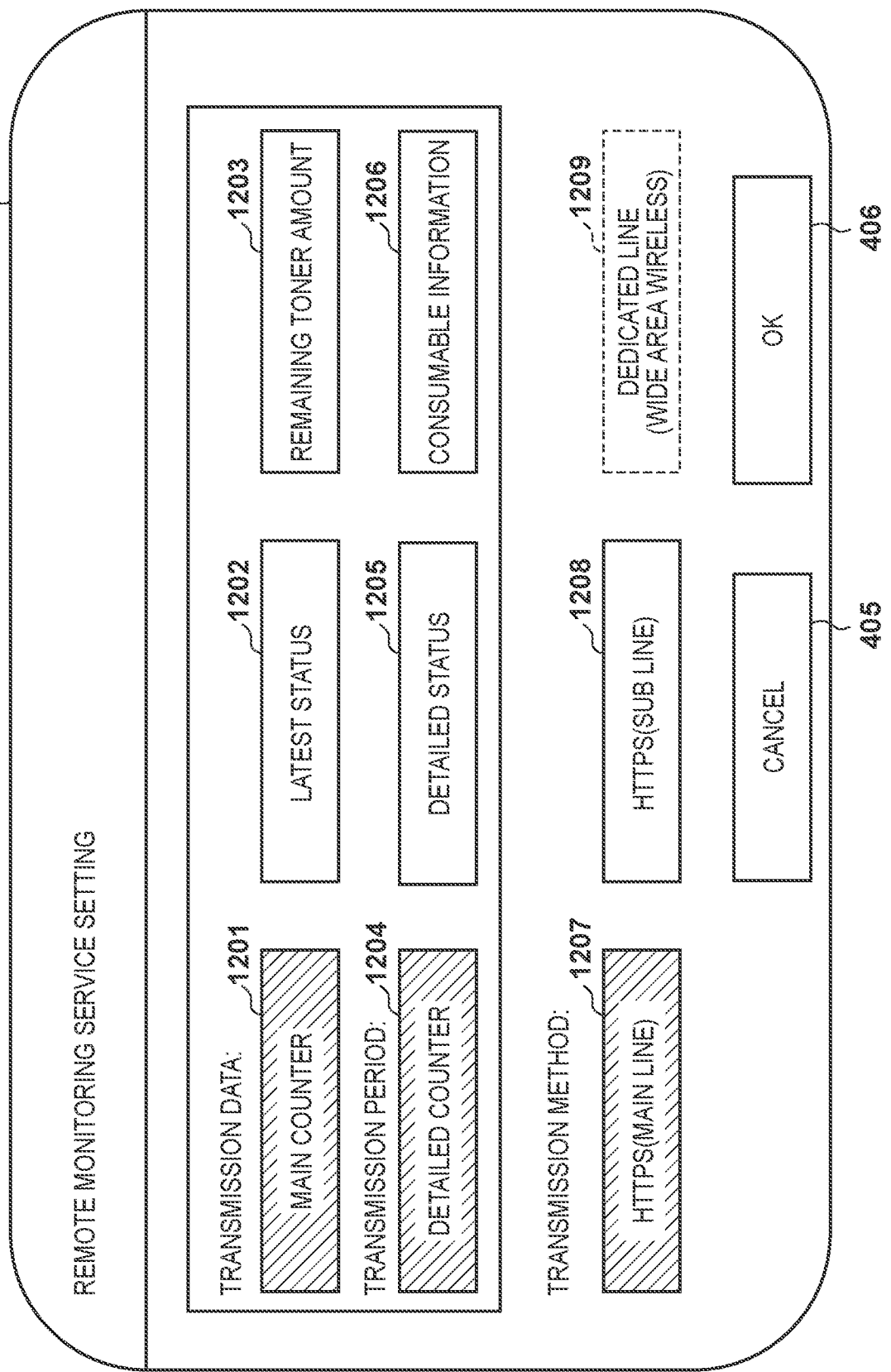

INFORMATION PROCESSING APPARATUS, METHOD OF CONTROLLING THE SAME, AND MEDIUM

BACKGROUND OF THE INVENTION

Field of the Invention

The present invention relates to an information processing apparatus, a method of controlling the same and a medium.

Description of the Related Art

For an information processing apparatus such as a multi-function peripheral or a printer (an MFP hereinafter), device management systems for remotely monitoring and managing the MFP by regularly transmitting device management information comprising device configuration information and various status information to an external management server have been spreading. For example, information of the remaining amount of consumables such as toner, operator calls for a sheet outage or the like, error occurrence situations, and counter information for output sheets as an operating history used for billing management are included as the device management information.

Meanwhile, in the field of IoT, attention is being drawn to LPWA (Low Power Wide Area) systems, in which a frequency of 920 MHz is used, as a communication method for realizing long distance communication in which power consumption is reduced (see Japanese Patent Laid-Open No. 2018-195931, for example). Specifically, LoRaWan, Sigfox, and the like, for example, exist for LPWA. For communication standards that fall under LPWA, although there are restrictions such as low speed and small transmittable data size (payload), there are characteristics such as a lower level of dependence on a communication environment in which an existing IP communication network is used and communication settings on the transmitting terminal side being simple.

Also, in Japanese Patent Laid-Open No. 2018-195931, a configuration for switching between a plurality of communication methods that include LPWA and transmitting position information of a mobile terminal to an external device is disclosed. In the information transmission processing for the mobile terminal indicated in Japanese Patent Laid-Open No. 2018-195931, in a case where communication with any one of a plurality of relay apparatuses (a smart meter) is possible, identification information of the mobile terminal can be transmitted to a relay apparatus as a goal of positional monitoring of the mobile terminal. This is a technique such as performing communication by a communication means that actually executes the notification processing and can be utilized from a plurality of communication means.

Also, in an information processing apparatus such as a conventional MFP, it is known that by using either a wired LAN or a wireless LAN that the apparatus is provided with, device management information of the information processing apparatus is transmitted via a network environment within an organization such as a company in which the MFP is connected. However, in these conventional techniques, there is a problem such as transmitting device management information being difficult in an environment where MFPs are not connected to an external network such as a WAN. For example, in such environments, there are cases in which the MFPs are installed in an independent environment and cases in which a user connection policy is that MFPs cannot connect to an external WAN or the like for security reasons.

Here, it can be understood that by installing a communication module such as LPWA in an information processing apparatus such as an MFP, transmission of device information can be performed even for an information processing apparatus installed in an environment in which communication with a WAN through a wired LAN or a wireless LAN cannot be performed. However, depending on the viewpoint of communication cost or the like and restrictions on the amount of data or the like to be notified to the management server, for example, there are cases in which a communication network that uses a conventionally known wired LAN or wireless LAN and has less restrictions on data size and speed is intended to be used. Furthermore, depending on the installation location of the information processing apparatus and the situation of the communication area for LPWA, there are cases such as not being able to perform suitable communication by LPWA or cases in which a communication network such as a wired LAN or a wireless LAN is intended to be used.

As described above, transmission is attempted on a network on which communication among a plurality of communication networks is possible in the conventional technique described in Japanese Patent Laid-Open No. 2018-195931. In other words, a use case such as selecting in advance a communication network that is to be used to transmit device information in consideration of an installation situation, operation policy, or the like has not been considered. Thus, it was difficult to properly perform control such as using an appropriately preselected communication network for transmitting device information in these use cases.

SUMMARY OF THE INVENTION

An aspect of the present invention is to provide a mechanism for enabling appropriate selection as a transmission means for transmitting device management information between a communication line whose communication speed is fast and for which there are few restrictions on the data amount that can be communicated therein, but which is dependent on a communication environment to be used, and a communication line whose communication speed is slow but for which the level of dependence on a communication environment is low, and for flexibly transmitting device intimation externally. In addition, as another aspect of the present invention, one of the objectives is to provide a mechanism for enhancing convenience for when transmitting device information externally.

The present invention includes the following configuration. That is, an information processing apparatus for transmitting, to an external unit, device management information is provided, the apparatus comprising: at least one memory that stores a set of instructions; at least one processor that executes the instructions; a first communication unit configured to, in relation to an external apparatus identified by an IP address on a network, perform communication that uses the IP address; and a second communication unit configured to communicate with an external apparatus by a communication method that is different from a communication method used by the first communication unit: wherein the instructions, when executed, cause the information processing apparatus to perform operations comprising: receiving a selection of either the first communication unit or the second communication unit as a communication unit used to transmit the device management information, wherein in a case where the second communication unit is selected as the communication unit used to transmit the device management information, among a plurality of types of management information that can be transmitted to an external unit in a case where the first communication unit is selected, a subset of the types of management information can be transmitted to an external unit.

According to an aspect of the present invention, by providing a plurality of communication means which vary in communication characteristics and configuring them to be selectable, it is possible to flexibly externally transmit device information. In addition, according to one aspect of the present invention, it becomes possible to enhance convenience for when transmitting device information to an external unit.

Further features of the present invention will become apparent from the following description of exemplary embodiments with reference to the attached drawings.

BRIEF DESCRIPTION OF THE DRAWINGS

FIG. 2A is a hardware configuration diagram of an MFP to which the present invention can be applied.

FIG. 10A is a view illustrating an example of a communication means selection screen in a second embodiment.

FIG. 10B is a view illustrating an example of the communication means selection screen in the second embodiment.

FIG. 11 is a flowchart illustrating a transmission procedure of device management information in the second embodiment.

FIG. 12A is a view illustrating an example of a communication means selection screen in a third embodiment.

FIG. 12B is a view illustrating an example of the communication means selection screen in the third embodiment.

DESCRIPTION OF THE EMBODIMENTS

Figure 1:
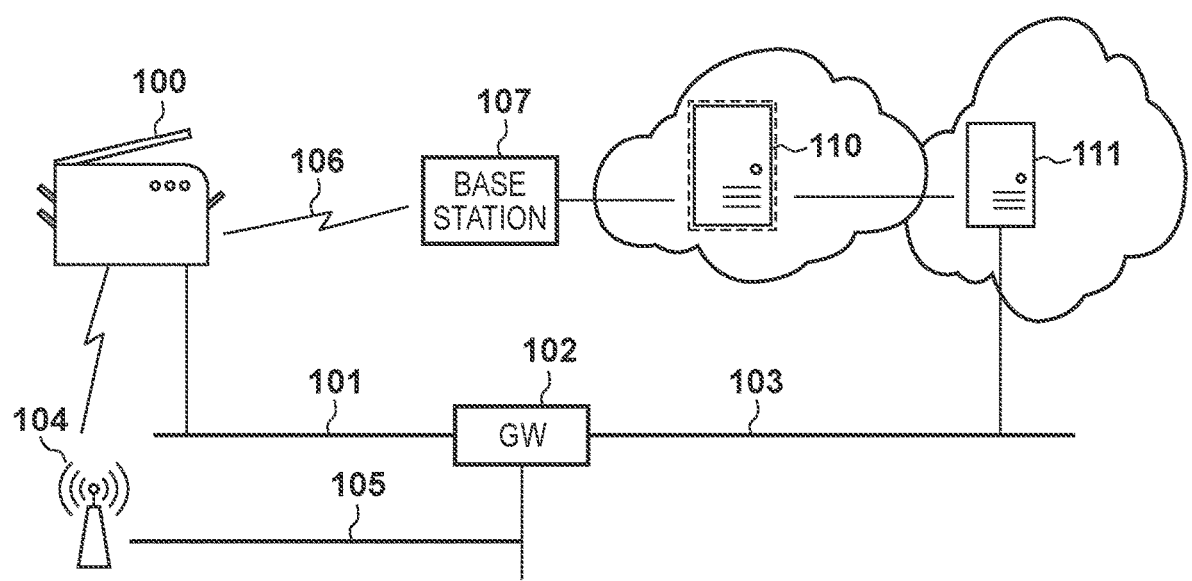
FIG. 1 is a view illustrating an example of a network configuration.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

System Configuration

FIG. 1 is a view illustrating a network configuration in which a multifunction peripheral (MFP) 100 is connected to a device management server 111 on a cloud through a plurality of communication interfaces according to the present embodiment. Note, the MFP 100 may also be called an image forming apparatus since it has an image forming function or may also be called an information processing apparatus from its information processing function.

The MFP 100 is connected to a local area network (LAN) 101 as an intranet via a router (not shown). The MFP 100 accepts a print instruction (or also including print data) from a PC (not shown) which is an external terminal connected to the same network and performs print processing in which an image is formed on a medium or transmission of a scanned image. Also, the MFP 100 is equipped with a wireless LAN (WLAN) interface, and in a wireless infrastructure mode, connects to a wireless LAN access point (AP hereinafter) 104 and joins a WLAN 105 via the AP 104.

A gateway 102 functions as a firewall which controls whether to permit communication of the LAN 101 and the WLAN 105 with an external network (the Internet, for example) 103. In the present embodiment, an example of a case in which transmission to the device management server 111 is set so it cannot be performed in the present embodiment due to this firewall is described.

The MFP 100 is further provided with a wireless controller 214 (described later) and can connect to a wide area wireless communication network 106 by a communication protocol in compliance with an LPW (Low Power Wide Area) communication standard, for example.

In the present embodiment, LoRaWAN (registered trademark), LoRa (registered trademark), SigFox (registered trademark), NB-IoT (Narrowband-IoT, registered trademark) or the like, for example, are assumed as a specific communication standard of LPWA. The MFP 100, independently from communication control by the gateway 102, communicates with a plurality of base stations 107 through the wide area wireless communication network 106. A wireless management cloud 110 stores and manages communication data based on the LPWA standard received via the base station 107 in association with an identifier for identifying the wireless controller. The wireless management cloud 110 provides a function such as reception data parsing to the device management server 111 (described later). The wireless management cloud 110 may be a server located on the Internet, for example.

The device management server 111 functions as a cloud that stores and manages device management information collected from a plurality of MFPs (not Shown) including the MFP 100. The device management server 111 stores the device management information associated with a serial number (S/N) which identifies each MFP. Here, the device management server 111 collects device management information directly from the MFP via the Internet 103 by a protocol such as HTTP or acquires device management information via the wireless management cloud 110.

MFP Configuration

FIG. 2A is a view illustrating a hardware configuration of the MFP 100. A control unit 200 which includes a CPU 201 controls the operation of the MFP 100 as a whole. The CPU 201 reads and executes a control program stored in a ROM 203 or an HDD 204, and performs various control such as communication control or image processing. A RAM 202 is used as a temporary area such as a main memory and a work area of the CPU 201, and also includes an NVRAM for storing setting values and the like. The HDD 204 is a non-volatile storage means for storing various user data, programs for executing functions, and the like, and also stores history information for jobs for printing and copying and the like, and output sheet counter information and the like as an operating history. A counter is one example of information indicating a print process amount. Alternatively, for example, information of the remaining amount of consumables such as toner, sheet outage operator calls and the like, and error occurrence situations may be recorded. Information including the past or present state of the MFP 100 is called device management information.

A printer interface (I/F) 206 connects a printer engine 211 (a printer hereinafter) to the control unit 200. The printer 211 performs image information onto a sheet fed from a sheet cassette based on image data inputted via the printer I/F 206. Continuing on, the MET 100 discharges a sheet, onto which an image was formed, which is an output article, to a sheet discharging tray (illustration omitted). The MFP 100 updates counter information which indicates a print process amount in accordance with the discharge operation. The method of image formation may be an electrogaphic method or may be an inkjet method. Also, a thermosensitive method, a sublimation method, or the like may also be used.

A scanner I/F 207 connects a scanner 212 to the control unit 200. The scanner 212 reads an original placed on a platen and generates image data. The image data that the scanner 212 generated can be printed by the printer 211, stored in the HDD 204, and transmitted to an external apparatus on the network via a wired LAN I/F 208 or a wireless LAN I/F 209.

An operation unit I/F 205 connects an operation unit 210 to the control unit 200. While the operation unit 210 is an LCD panel that receives various setting instructions of the MFP 100, it also selves as a display unit that displays various states of the device.

The CPU 201 realizes communication with the apparatus on the LAN or WLAN via the wired LAN I/F 208 or the wireless LAN I/F 209 which is a first communication unit.

The wireless controller 214 which is a second communication unit performs communication, in compliance with an LPWA communication standard, with the base station 107 illustrated in FIG. 1 based on a transmission-reception instruction received from the CPU 201 of the control unit 200 via a wireless controller I/F 213.

Wireless Controller Configuration

Figure 2B:
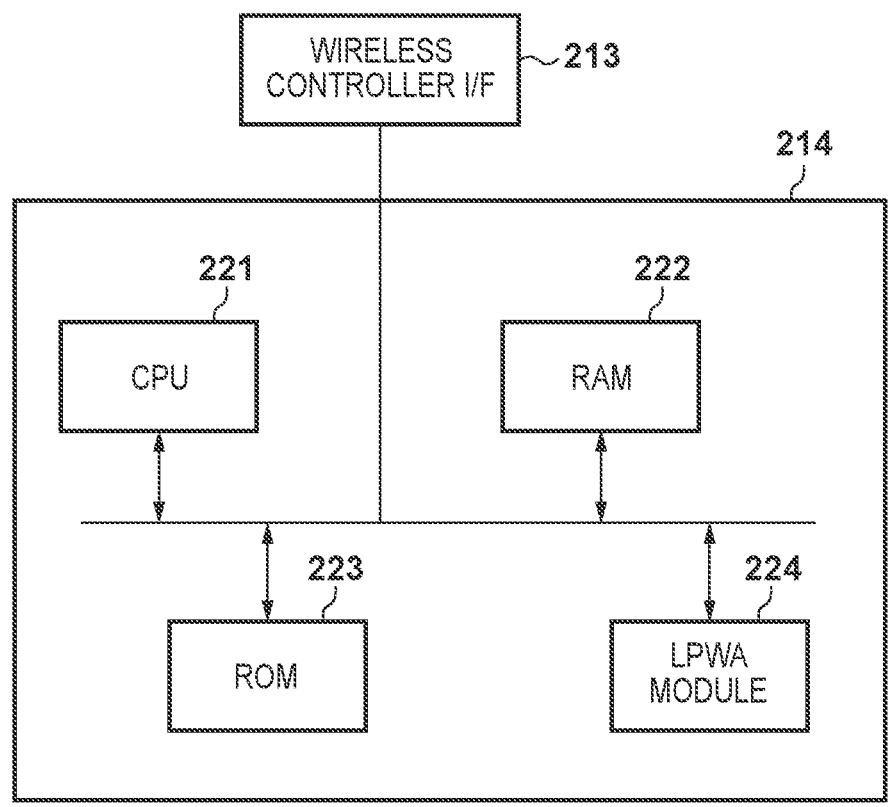
FIG. 2B is a hardware configuration diagram of a wireless controller to which the present invention can be applied.

FIG. 2B is a view illustrating a hardware configuration of the wireless controller 214 which performs transmission control. A CPU 221 of the same figure, by reading and executing a control program as a wireless controller stored in a ROM 223, performs control of LPWA communication by an LPWA module 224 which includes a 920 MHz wireless antenna. Here, the control program read into the CPU 221 is configured so as to perform transmission/reception control based on the LPWA standard by using a communication instruction received from the control unit 200 of the MFP 100 via the wireless controller I/F 213 as a trigger.

A RAM 222 is the main memory and the work area of the CPU 221, and it is also used as an area for temporarily storing a data frame to be transmitted/received by an LPWA communication.

Note, although the wireless controller 214 performs control of transmission/reception based on the communication instruction from the control unit 200 in the present embodiment, a control program may be configured so that the wireless controller 214 independently performs LPWA communication.

Software Configuration

Figure 3:
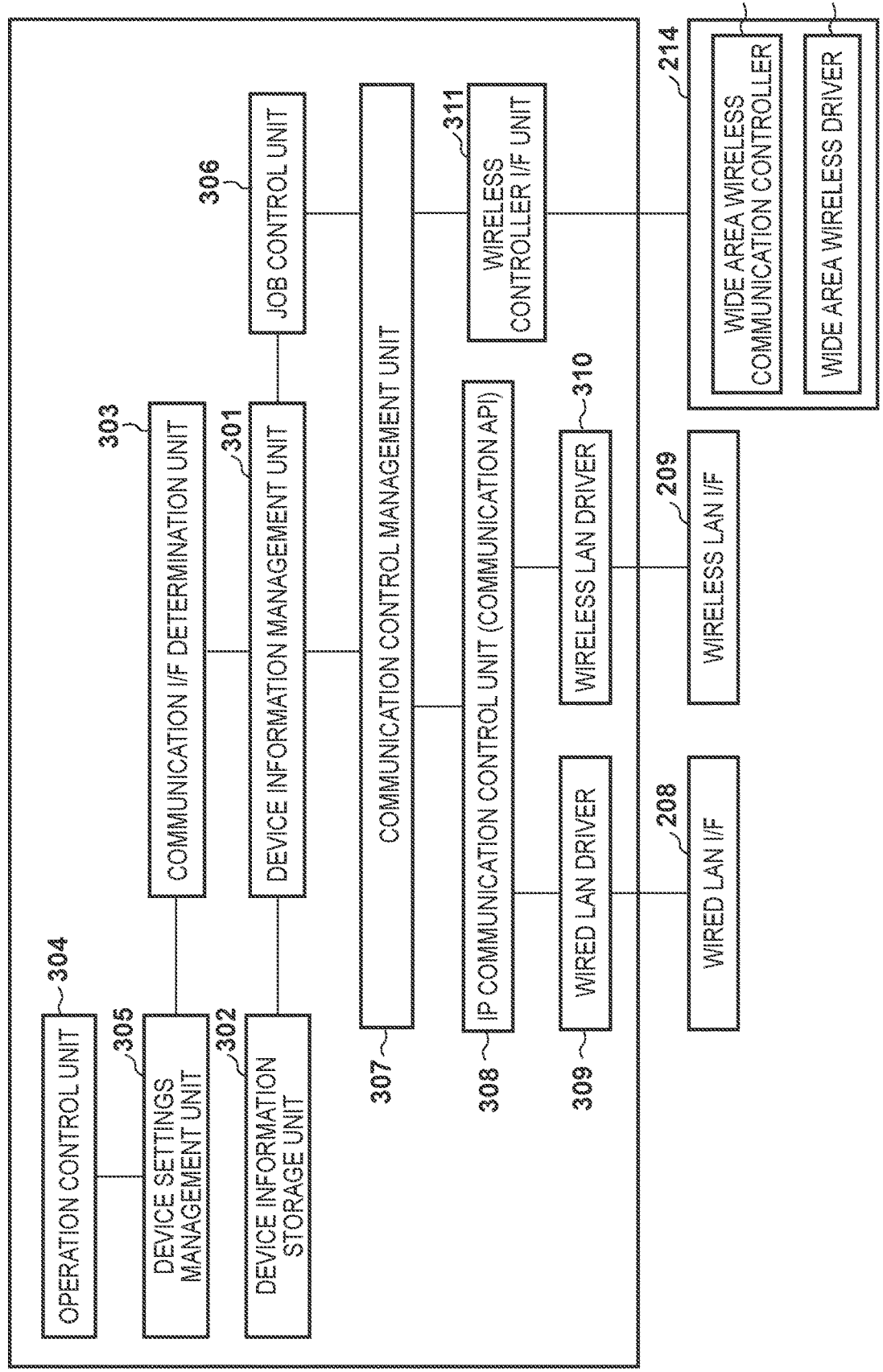
FIG. 3 is a software configuration diagram of the MFP to which the present invention can be applied.

FIG. 3 is a block diagram expressing a configuration of software executed by the control unit 200 and the wireless controller 214 of the MFP 100. The software executed by the control unit 200 is realized by the CPU 201 reading and executing a program stored in the ROM 203 or the HDD 204. Also, the software executed by the wireless controller 214 is realized by the CPU 221 reading and executing a program stored in the ROM 223.

An operation control unit 304 displays a screen image to a user on the operation unit 210. At the same time, input instructions by a user operation are detected from a pressed state of an operation button or the like that is displayed on the screen, and input of a setting value associated with a screen configuration component such as the operation button and instructions to execute various processes are received thereby.

While a device settings management unit 305 stores the data of the setting value received from the operation control unit 304 in the RAM 202, it also performs reading of the setting value based on the request from each of the other control units. For example, in a case where the user desires to change any of the device settings, the operation control unit 304 detects the content that the user inputted to the operation unit 210, and the device settings management unit 305 stores it in the RAM 202 as a setting value by a request from the operation control unit 304.

A job control unit 306 processes each function such as print, copy, and fax as a job, and the job control unit 306 notifies a device information storage unit 302 of the status information of each job. In this way, the device management information comprising an updated counter or error information is stored. A part of the HDD 204 or the RAM 202 is allocated as an area that the device information storage unit 302 manages for the storage of the device management information.

A communication I/F determination unit 303 reads the setting value stored in the device settings management unit 305 and determines a communication means to be used as the communication means of the device management information according to the flow of FIG. 8 described later.

A device information management unit 301 reads the device management information stored in the device information storage unit 302 and performs an instruction for transmission of the device management information to a communication control management unit 307. At this time, the device information management unit 301 determines the device management information that needs to be transmitted based on the communication means that the communication I/F determination unit 303 determined and instructs this to be outputted to the communication control management unit 307.

The communication control management unit 307, in accordance with the content of the instruction from the job control unit 306 which is a high-ranking application and the device information management unit 301, performs communication control by using either an IP communication or the LPWA communication by the wired LAN or the wireless LAN. In the present embodiment, for simplicity, the communication control management unit 307 is assumed to provide a communication function to the job control unit 306 by RAW/LPR/IPP, and to the device information management unit 301 by HTTP/HTTPS and LPWA. Also, the communication control management unit 307 is assumed to switch to a lower ranking communication control unit according to the content of each instruction.

Also, the communication control management unit 307 performs various setting necessary for IP communication in accordance with a network setting value relating to TCP/IP such as an IP address stored in the device settings management unit 305.

It is assumed that an IP communication control unit 308 is a network library group that supplies an API for performing IP communication and supports a communication function, which uses a Web API by HTTP/HTTPS, and various printing protocols necessary for job control in the present embodiment. Also, the IP communication control unit 308 determines the interface that needs to be transmitted-received based on content designated via the communication control management unit 307 or a setting value stored in the device settings management unit 305. In the present embodiment, it is assumed that the wired LAN is allocated to a main line and the wireless LAN is allocated to a sub line and that they form the network shown in FIG. 1.

A wired LAN driver 309 and a wireless LAN driver 310 are device divers for controlling the wired LAN and the wireless LAN hardware, respectively. The wired LAN driver 309 and the wireless LAN driver 310 form a part of a protocol stack for realizing IP communication as a part of the OS that collectively controls the control unit 200.

A wireless controller I/F unit 311 is a library group that is called in a case where the communication means designated by the communication control management unit 307 is LPWA. A wireless controller I/F unit 311 is called from both sides in order to transmit/receive data between the control unit 200 and the wireless controller 214, instruct execution of a process, or receive a processing result.

A wide area wireless communication controller 320 of the wireless controller 214 is a control unit, that performs LPWA communication which uses the LPWA module 224, by controlling a wide area wireless driver 321 based on the transmission instruction accepted from the control unit 200.

Example of a Transmission Method Selection Screen

Figure 4A:
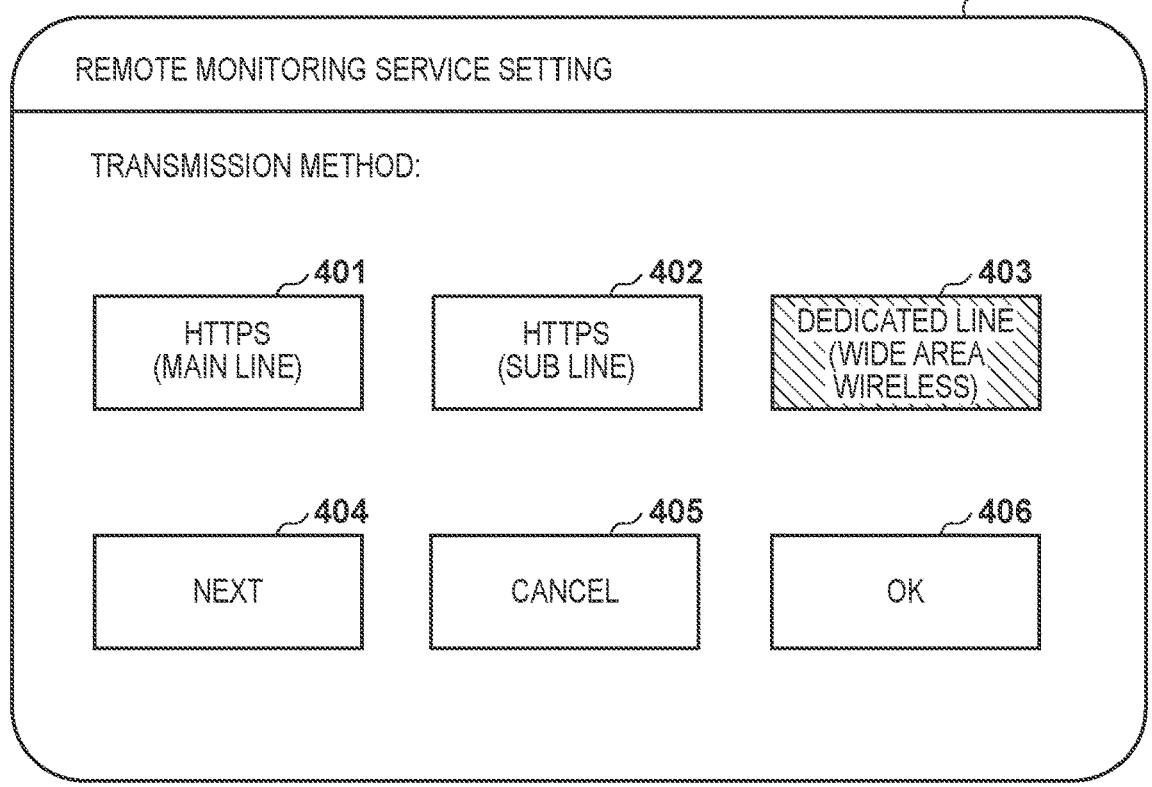
FIG. 4A is a view illustrating an example of a communication means selection screen in a first embodiment.

FIG. 4A is a view illustrating an example of an operation screen, displayed on the operation unit 210, for selecting a line that will be used as a transmission method of the device management information (alternatively called a transmission means, a communication method, or a communication means). In the present embodiment, an initial setting mode executed once when the MFP 100 is initially installed is provided. It is assumed that by the user (serviceman) selecting "remote monitoring service setting" which is one item of the initial setting mode, a setting screen 400 is displayed on the operation unit 210. Note, it is assumed that, in the initial setting mode, in addition to the "remote monitoring service setting", settings necessary for IP communication such as the IP address for the main line or the sub line and the like are performed. Furthermore, configuration may be taken such that a setting such as a date or time zone is accepted.

As described above, the initial setting mode is used in a case where a first-time setup (alternatively, called initial setup processing) of the MFP 100 is performed. Note, in a case where the MFP 100 accepts an operation of a user such as an administrator or maintenance engineer, it performs control for resetting (restoring) operation setting values of the MFP 100 to a factory shipping state (an initial state). The initial setting mode is also called in a case where the control for such resetting is performed. Note, although a reset of the operation setting value is performed in the control for resetting, a reset of various counters is not performed.

Each of buttons 401 to 403 displayed on the setting screen 400 are selection items for selecting a transmission method of the device management information and are configured so that any one can be exclusively selected. By detecting a pressing operation of an OK button 406 in a state where any one of the transmission methods has been selected, the selected item is stored to the device settings management unit 305. Here, control of the display of the menu screen and detection of a press of a button is performed by the operation control unit 304.

The button 401 is a button for selecting HTTPS (main line) as the transmission method and the device management information is transmitted through the wired LAN 101 which was allocated to the main line.

Similarly, the button 402 is a button for selecting HTTPS (sub line) as the transmission method and the device management information is transmitted through the wireless LAN 104 which was allocated to the sub line. Note, in a case of a setting for which the interface is not allocated to the sub line, display is controlled such that the button 402 is grayed out and cannot be selected.

The button 403 is a button for selecting a dedicated line (wide area wireless) as a transmission method, and device management information is transmitted by LPWA communication without using a main line or a sub line. In the same figure, a state in which dedicated line (wide area wireless) is selected is illustrated.

The button 404 is a button for transitioning, in accordance with the result of selecting the transmission method, to a screen for selecting data to be transmitted as the device management information and a transmission period, and these screen transitions are also performed by the operation control unit 304.

Figure 4B:
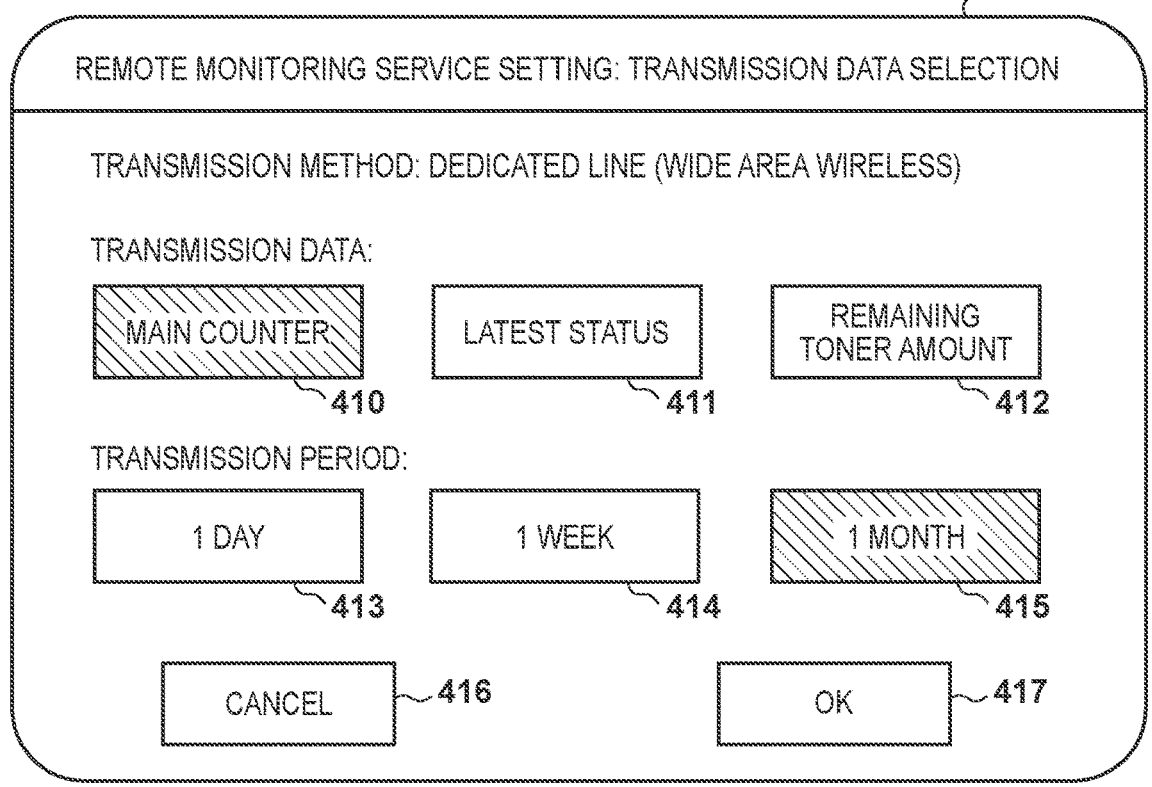
FIG. 4B is a view illustrating an example of a communication data selection screen in the first embodiment.
Figure 4C:
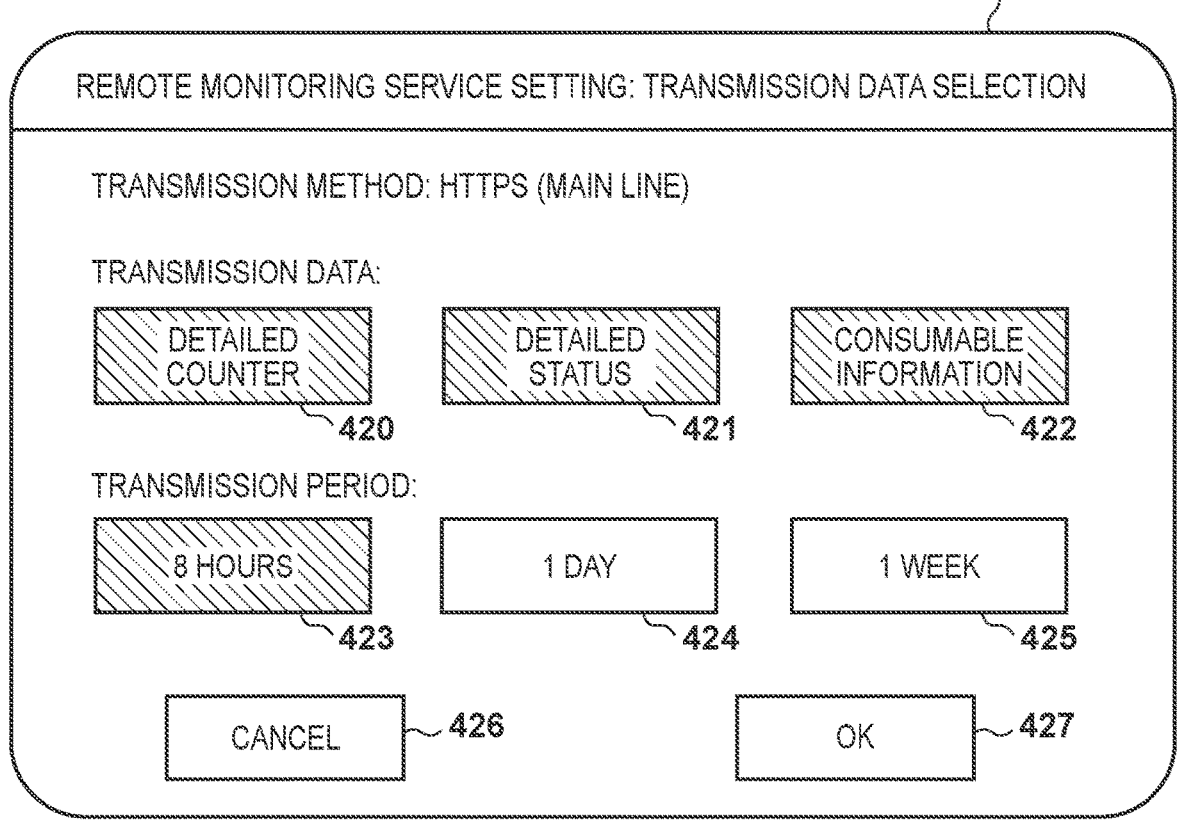
FIG. 4C is a view illustrating an example of a communication data selection screen in the first embodiment.

As described above, selection processing of the communication method to be used in transmission of the device management information is performed as one process of the initial setup processing. In the present embodiment, in a case where the dedicated line (wide area wireless) is selected as the transmission method, the screen 401 of FIG. 4B is transitioned to, and in a case where HTTPS (main line) is selected, a screen 402 of FIG. 4C is transitioned to. In the present embodiment, the content of the device management information to be a transmission target and the initial selection state are changed in accordance with the protocol characteristics or communication speed of the selected transmission method. Note, in a case where HTTPS (sub line) is selected as the transmission method, a figure and description are omitted because it is the same as a case where HTTPS (main line) is selected.

Example of a Transmission Data Selection Screen

In the transmission data selection screen 401 illustrated in FIG. 4B, it is indicated that "dedicated line (wide area wireless)" is selected as the transmission method and configuration is such that the transmission data and the transmission period can be selected by buttons 410 to 412 and by buttons 413 to 415, respectively. Note, configuration is such that a plurality of transmission data can be selected at the same time, and any one of the options can be exclusively selected for the transmission period.

By selecting the button 410, three predetermined counters (described later) from among the counter information are selected as a transmission target. In the same figure, a button in a selected state is indicated by being highlighted.

Similarly, by selecting button 411, a status code in which status information indicating an operator call or service call is defined in advance is selected as a transmission target. In the present embodiment, it is assumed that up to 3 statuses in an unreleased state are transmitted, and history information that has been released is not included.

By selecting the button 412, toner remaining amount information having the highest reference frequency among the consumable information is selected as a transmission target. Details of the transmission data are described later using FIG. 5.

Note, in the present embodiment, only the main counter 410 is set as the selected transmission data in the initial state, and the operator (such as a serviceman) can increase the data to be a transmission target according to the purpose of the device management information.

In the present embodiment, the transmission period can be selected from any one of 1 day 413, 1 week 414 and 1 month 415 and in the initial setting, 1 month is selected; however, the transmission period is not necessarily limited to this.

Note, for the selection result, by the operation control unit 304 detecting the pressing operation of an OK button 417, the selected items are stored in the device settings management unit 305 as a setting value, but in a case where the pressing of a cancel button 416 is detected, the screen 400 is returned to without updating the setting value.

In the transmission data selection screen 402 illustrated in FIG. 4C, it is indicated that "HTTPS (main line)" is selected as the transmission method and configuration is such that the transmission data and the transmission period can be selected by buttons 420 to 422 and by buttons 423 to 425, respectively. Note, description is omitted for the sections that are the same as in FIG. 4B.

When "HTTP (main line)", which is an IP communication, is selected as the transmission method, the detailed counter 420, the detailed status 421 which includes history, and consumable information 422 which includes the remaining toner amount and replacement components other than toner can all be selected as selection items of transmission data. Note, since the content of each transmission data may be the same as what is transmitted as existing device management information, detailed description thereof is omitted. Also, in a case where HTTP (main line) is used it is assumed that in the present embodiment, all of the above three items are selected in the initial state and are included in the data to be a transmission target since there is no restriction for the transmission data.

The transmission period can be selected from any one of 8 hours 423, 1 day 424, and 1 week 425, which are more frequent than LPWA communication, and in the initial setting, 8 hours is selected. In other words, in the present embodiment, configuration is such that compared to an interval of the shortest period when information is transmitted on a communication channel using LPWA communication, an interval of the shortest period when information is transmitted on a communication channel using IP communication by the main line and the sub line is shorter.

As described above, a selection of selectable a transmission target data is restricted in the user interface in accordance with the selected transmission method. Specifically, when wide area wireless which has a lower communication speed is selected, only limited data such as a main counter, the most recent status, and the remaining toner amount can be selected as the transmission data. In contrast to this, when a main line or sub line having a higher communication speed are selected, larger and more detailed data can be selected such as a larger detailed counter, a detailed status and consumable information as the transmission data.

LPWA Frame Format

Figure 5:
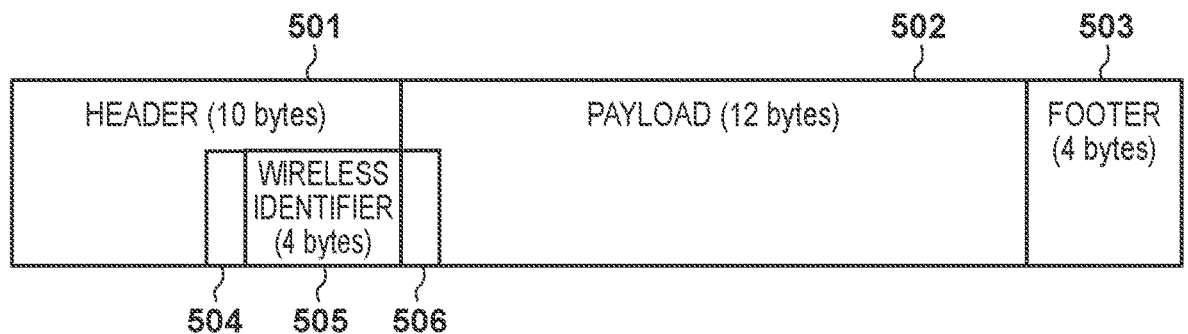
FIG. 5 is a view illustrating an example of a frame format of transmission data.

Continuing on, with reference to FIG. 5, a frame format indicating device management information transmitted by LPWA communication in the present embodiment is described.

In the same figure, reference numerals 501 and 503 are a header portion and a footer portion defined by the LPWA communication standard, and each are added by the wireless controller 214 at the time of transmission. In the present embodiment, it is assumed that the header portion 501 is configured from 10 bytes of data, and it includes at least a data size 504 (1 byte) and a wireless identifier 505 (4 bytes) of a payload portion 502 described later. However, configuration may be taken in accordance with the LPWA communication standard to be used. Note, the wireless identifier 505 is a device identifier (DeviceID) allocated to each LPWA controller in advance, and the wireless management cloud 110 can uniquely specify an LPWA module by the wireless identifier 505.

Although it is assumed that the footer portion is configured by 4 bytes which include code for error detection, configuration may be taken in accordance with the LPWA communication standard to be used, similarly to the header.

The payload portion 502 is an actual data portion of a maximum of 12 bytes which include the content of the device management information, and it defines data content and a format to be transmitted by a data type 506 allocated to the first 3 bits. Hereinafter, 4 types of data types allocated to each bit value are shown. (Data type)
000: main counter
001: status information
010: toner remaining amount information
011: device identification ID (serial number S/N)
100-111: reserve.

In the present embodiment, the frame formats to be transmitted as the data types are as follows, and each of the data (1) to (4) is hid in a payload of 12 bytes (96 bits) in total including the 3 bits of the data type 506.

(1) Main Counter (Data Type=000)
  Counter number: a monochrome device is 1 and a color device is 3 (2 bits) Only a counter total described below is included in the monochrome device, and three counters described below are all included in the color device.
  Counter total: a number of printed sheets counted regardless of the sheet size including all printer/copy/FAX (30 bits)
  Total (monocolor): a number of printed sheets counted regardless of the sheet size for only monocolor printing including all printer/copy/FAX (30 bits)
  Total (BW): a number of printed sheets counted regardless of the sheet size for only black and white printing including all print/copy/FAX (30 bits).

(2) Status Information (Data Type=001)
Number of statuses: maximum of 3 (2 bits)
Status code: a predetermined code allocated to each of door open/sheet outage/toner low/no toner/various service calls: (30 bits×number)
(3) Toner Remaining Amount Information (Data Type=010)
Number of toner containers: a monochrome device is a maximum of 2 (K and a waste toner container), and a color device is a maximum of 5 (each color of CMYK and residual toner) (4 bits)
Remaining toner amount: the remaining amount of toner of each color of CMYK and waste toner container is stored in percentage (8 bits×number of toner containers
(4) Device Identification ID (Data Type=011)
Device identification ID: a device identification ID for uniquely specifying an MFP, and in the present embodiment, a serial number (S/N) stored in advance in the ROM 203 (92 bits).

Here, the device identification ID, in order to manage by MFPs the device management information transmitted froth the MFP, is transmitted to the device management server 111 and is registered together with the wireless identifier 505 for uniquely specifying an LPWA module. This processing, before the transmission method is selected, is executed once when the MFP is initially installed and is described later using steps 601 to 604 in FIG. 6. The above is the information to be transmitted by a packet indicated in FIG. 5.

In a case where the main line or the sub line is selected as the transmission method, data that is selected from among the detailed counter, the detailed status, and the consumable information can be transmitted in place of the above data. In the detailed counter, in addition to the main counter described above, detailed counters such as the number of printed sheets per sheet size, the number of printed sheets for each of double-sided and single-sided sheets, the number of printed Sheets for each of copying and printing, for example, may be included. These are merely examples, as a matter of course. Also, the detailed status, in addition to the current status, may include a history related to errors, consumable replacement, and the like. Also, the consumable information, in addition to the remaining toner amount, may include the remaining amount of sheets. Accordingly, in a case where the main line or the sub line is selected, compared to a case where wide area wireless is selected, the amount of data to be transmitted increases by approximately several times, for example.

Identification ID Registration Procedure

Figure 6:
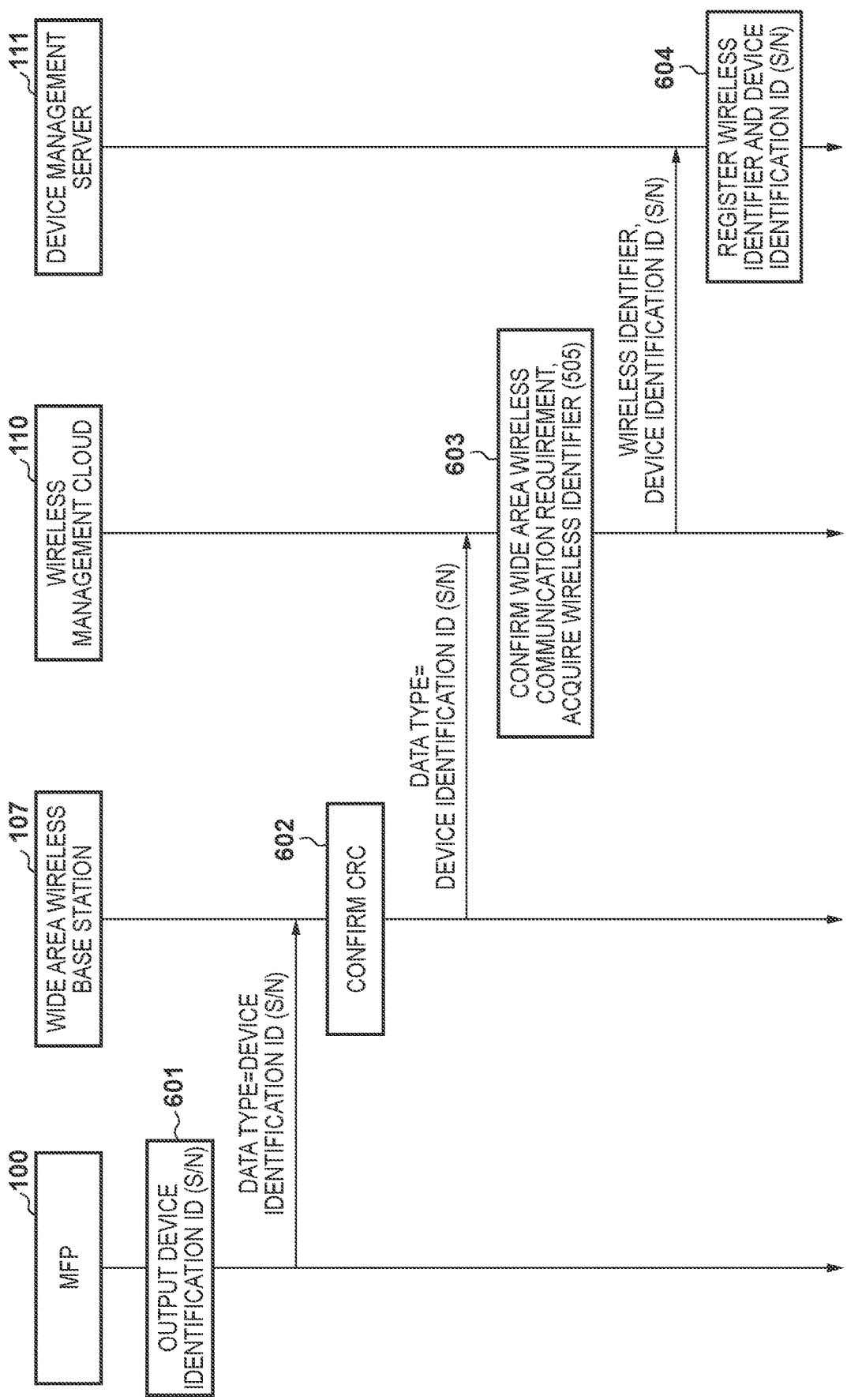
FIG. 6 is a view illustrating one example of a transmission sequence in a network configuration to which the present invention can be applied.

FIG. 6 is a view illustrating a sequence up to which the MFP 100 by LPWA communication registers the device identification ID to the device management server 111. In the same figure, the device information management unit 301 of the MFP 100 generates transmission data of which the data type is 011 (device identification LD) and instructs the communication control management unit 307 to output the data (601).

In the base station 107, a CRC included in the footer portion 503 of the received data is confirmed in order to confirm the existence or absence of data error. The base station 107, if there is no error in the data, transmits the data to the wireless management cloud 110, but if there is an error, transmits reception error information (602).

In the wireless management cloud 110, based on parameters such as the wireless identifier 505 included in the header portion 501, confirmation of data requirements based on the specification of the wireless controller and the LPWA standard is performed. Then, if the wireless controller can be specified and it can be confirmed that the data is normal, a message, which includes the wireless identifier 505 and the device identification ID which is data within a payload, is generated and then transmitted to the device management server 111 (603).

Finally, the device management server 111, in a case where the data type of the received packet is a device identification ID, generates a management entry of the device management information, which is identified by a device identification ID and holds the wireless identifier 505 as a key (604). Also, regarding the messages received hereinafter from the MFP 100, the device management server 111 searches for an entry including the same key as the wireless identifier 505 included in the message and then registers the message content the located entry. In this way, it is possible to manage the device management information of the uniquely identified MFPs.

Note, assume that the procedure for registering the wireless identifier 505 in relation to the wireless management cloud 110 and activating the wireless controller 214 in order to make the LPWA communication possible is something that is registered in advance as part of the manufacturing process of the MFP in the present embodiment. Accordingly, when the MFP 100 is installed, assume that the wireless controller 214 is in a state in which it has been registered to the wireless management cloud 110.

By the above procedure, an entry of the MFP 100 is created in the device management server 111, and data transmitted from the MFP 100 is registered to the entry of the MFP 100.

Transmission Setting Procedure

Hereinafter, using each of the flowcharts in FIG. 7 to FIG. 9, a procedure for the device information management unit 301 and the communication I/F determination unit 303, from when a determination of a transmission method, transmission data, and a transmission period is made based on the settings of remote monitoring service setting screens 400 to 402 to when transmission is performed, will be described. Here, the processing indicated in each of the flowcharts in FIGS. 7, 8, and 9 is realized by the CPU 201 reading to the RAM 202 a program stored in the ROM 203 or the HDD 204 and then executing the program.

Figure 7:
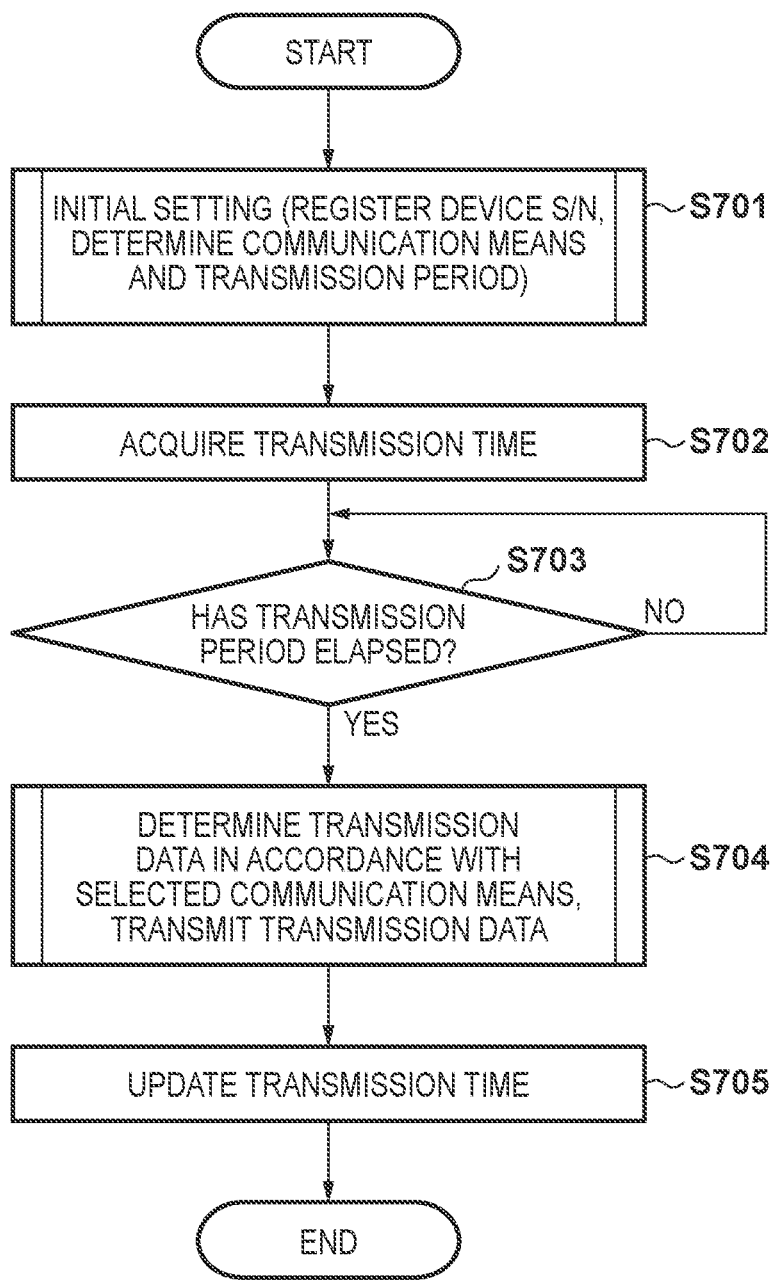
FIG. 7 is a flowchart illustrating an overall transmission procedure of device management information in the first embodiment.
Figure 8:
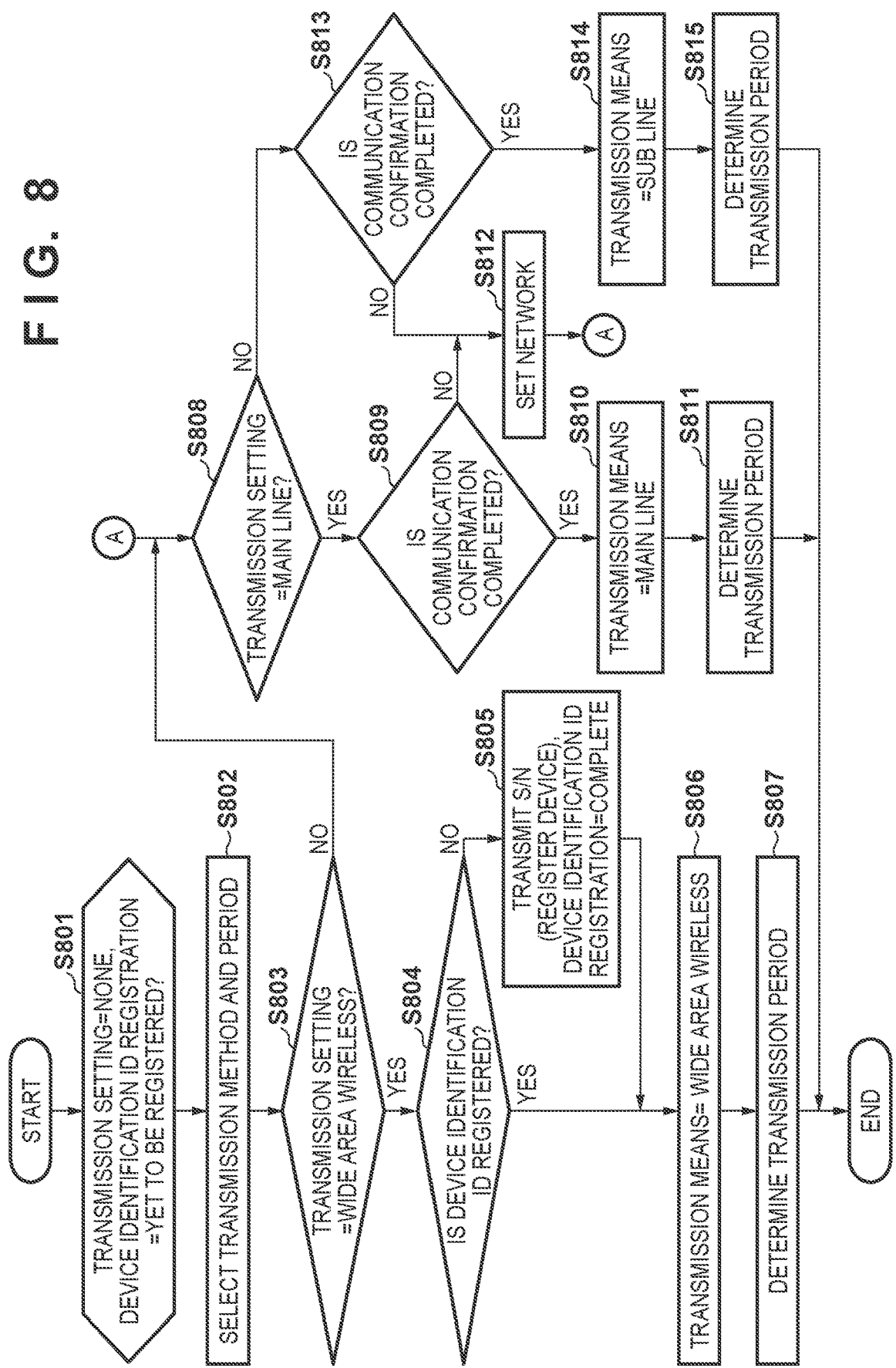
FIG. 8 is a flowchart illustrating details of step S701 of FIG. 7.
Figure 9:
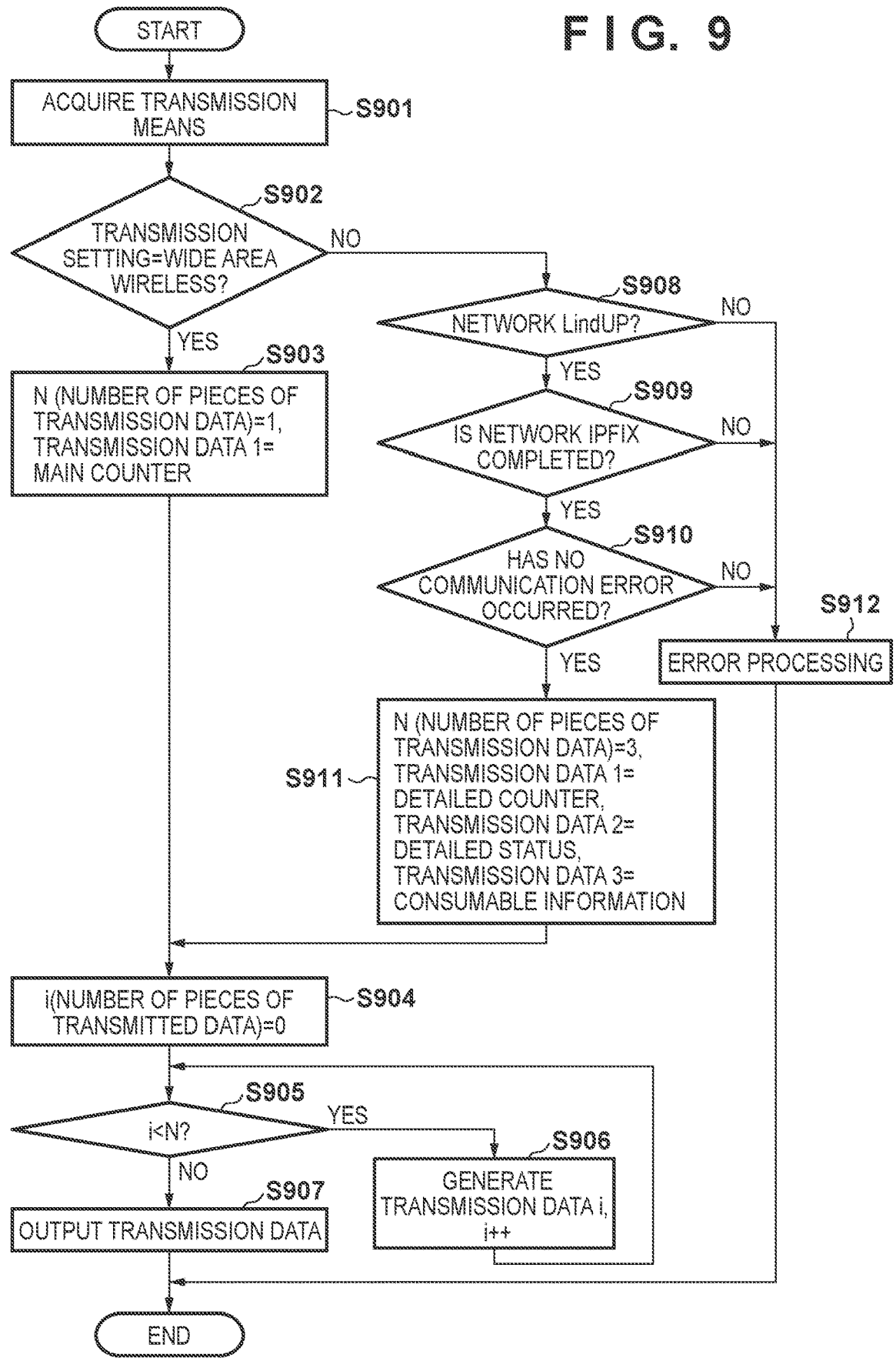
FIG. 9 is a flowchart illustrating details of step S704 of FIG. 7.

FIG. 17 is a flowchart illustrating an overall transmission procedure of the device management information in the present embodiment, FIG. 8 is a flowchart illustrating the details of step S701 in FIG. 7, and FIG. 9 is a flowchart illustrating the details of step S704 in FIG. 7. It is assumed that the flowchart illustrated in FIG. 7 is something that is executed when the power supply of the MFP is started, after the MFP performs an operation to reset to an initial state of factory shipping or to a factory shipment value.

First, FIG. 7 will be described. The communication I/F determination unit 303, as an initial setting, determines a transmission method and a transmission period, and then performs the initial setting (S701). The details of step S701 will be described later using FIG. 8. Then, after the initial setting is completed, the device information management unit 301, by repeating step S702 and subsequent steps based on the determined transmission period, performs regular transmission of the device management information. That is, by reading out from the RAM 202 a time at which the device management information was previously transmitted (S702), acquiring the current time using a timer provided in the OS, and then comparing them, whether the transmission period set in accordance with the transmission means has elapsed is examined (S703). Then, in a case where it is determined that the transmission period has elapsed since the previous transmission time, transmission data is determined in accordance with the selected transmission method and a transmission instruction is performed in relation to the communication control management unit 307 (S704). Note, configuration is such that in step S702, zero, which indicates that the transmission time is yet to be transmitted when the power supply is initially inputted, is set as an initial value, and in step S703, the device information management unit 301 determines that the transmission period has elapsed.

Meanwhile, the device information management unit 301, in a case where it determines that the transmission period has not elapsed in step S703, returns to step S703 after setting a predetermined weight.

Finally, the device information management unit 301 updates the transmission time in accordance with the current time (S705) and then ends one round of transmission processing. Note, the processing in FIG. 7 may be repeatedly executed on a regular basis, and in a case where it is configured so, it may branch to step S702 after step S705. In such a case, it is assumed that a plurality of programs including the processing program in FIG. 7 can be executed in parallel. Otherwise, a timer that has been set to a duration of the transmission period or shorter may be started after the execution of step S705, for example, and the processing may be temporarily ended. Then, using elapsing of the timer as a trigger, the execution may be started from step S702.

The flowchart illustrated in FIG. 8 indicates the detailed procedure of step S701 in FIG. 7 and is processed only once in the present embodiment when the MFP 100 is started for the first time. For this, in the device settings management unit 305, it is assumed that values indicating that the setting value of the transmission method (a transmission setting hereinafter) is "none" and that processing for registering the device identification ID is "yet to be processed" (i.e., yet to be executed) are held as respective initial values (factory shipment value) (S801). Note, in the following description, the setting value of the transmission method that is set by an operation of the remote monitoring service setting screen 400 and is stored in the device settings management unit 305 is called a "transmission setting". Meanwhile, a mode of operation for when transmitting device management information in accordance with the transmission period when the MFP 100 is operating is called a "transmission method".

The communication I/F determination unit 303 reads the transmission setting and if the setting value is "none", determines that the transmission method is yet to be set, instructs the displaying of the remote monitoring service setting screen 400 in relation to the operation control unit 304, and receives the selection of the transmission method by the operator (S802). Note, if the initial setting is completed, the processing in FIG. 8 may be ended and branch to step S702 in FIG. 7.

Then, the communication I/F determination unit 303 receives a result of selection of the transmission method by the operation control unit 304 and then determines the transmission method and the transmission period in the subsequent steps. Note, for simplicity, assume that in the present embodiment, the transmission setting to be selected is any one of HTTPS (main line) 401 to the dedicated line (wide area wireless) 403.

The communication I/F determination unit 303, in a case where the transmission setting is set to the wide area wireless 403 (S803: Yes), examines whether the device identification ID is registered (S804). This determination may reference information indicating whether or not the device type ID set in step S805 is registered. If it is registered, the transmission method is set to wide area wireless as something that indicates the current mode of operation (S806). Then the setting value of the transmission period selected in the transmission data selection screen 401 is read and the transmission period is determined as something that indicates the current mode of operation (S807).

Meanwhile, when the power source is initially activated, because the value which indicates that the processing for registering the device identification ID is "yet to be processed" is set as an initial value, step S804 is always determined to be No and the device identification ID (S/N) is registered to the device management server 111 in accordance with the sequence in FIG. 6 (S805). Also, for the sake of descriptive convenience, it is assumed that the registration of the device identification ID always succeeds; however, configuration may be such that in a case where registration failure is detected, in addition to a plurality of retries being performed or the remote monitoring service setting screen 400 being displayed again, a message prompting a user to select another transmission method and the like is displayed.

The communication I/F determination unit 303, in a case where it determines that the transmission setting is not set to wide area wireless 403 (S803: No), examines whether the transmission setting is set to the main line (S808). The communication I/F determination unit 303, in a case where it determines that the transmission setting is set to the main line, examines whether the IP communication setting is completed and whether communication with the device management server 111 is possible using a ping command, for example (S809). If there is no error in confirmation of communication with the device management server 111, the transmission method is set to HTTPS (main line) as something that indicates the current mode of operation (S810), and the transmission period is determined as in step S807 (S811). Note, it is assumed that upon the confirmation of communication in step S809, similarly to a case where the transmission setting is wide area wireless, the device identification ID (S/N) is registered to the device management server 111.

Meanwhile, in a case where communication with the device management server 111 could not be performed in step S809, the communication I/F determination unit 303, in relation to the operation control unit 304, instructs to display an IP communication setting screen (not shown) such as an IP address, a subnet, and DHCP (S812). It is assumed that the processing returns to step S808 after an IP communication setting is completed on that display screen in order to perform the communication confirmation again; however, configuration may be such that the processing returns to step S802 in order to select wide area wireless as a target again.

Meanwhile, in a case where it is determined that the transmission setting is not the main line 401 in step S808, it means that the sub line 402 is selected for the transmission setting. Accordingly, the transmission method and the transmission period are determined in step S813 and the subsequent steps; however, these processes may be the same as the main line 401, and therefore, description will be omitted.

By the above processing, the transmission method and the transmission period are set as something that indicates the current mode of operation.

FIG. 9 is a flowchart illustrating the details of step S704 in FIG. 7 and indicates a procedure in which the device information management unit 301 performs transmission of device information as one round of a transmission period.

Also, in the present embodiment, it is described as a procedure corresponding to a case where the transmission data indicated in FIG. 4B is selected.

In the same figure, the device information management unit 301 examines the current transmission method in step S901 and if the transmission method is wide area wireless (S902: Yes), generates transmission data for performing transmission instruction in relation to the wide area wireless communication controller 320 (S903). Here, from the selection content indicated in FIG. 4B, the number of pieces of transmission data (N)=1 and transmission data 1=main counter are set. It is assumed that for the type of data to be transmitted, setting values corresponding to 410 to 412 selected in FIG. 4B are stored in the device settings management unit 305.

Then, the device information management unit 301, after initializing the number of pieces of transmitted data (i) to 0 (S904), generates the transmission data until i equals N, in other words, the number of pieces set to be a transmission target (S905 to S906). Transmission data to be targeted is generated, by the device information management unit 301 reading out the device management information associated with a data type 507 and then stored in the device information storage unit 302 and then by being converted to a predetermined format to be stored in the payload 502.

After the number of Pieces of transmission data to be a transmission target was generated, the device information management unit 301 instructs to output the transmission data in relation to the communication control management unit 307 (S907) and then ends one round of processing.

Meanwhile, the device information management unit 301, in a case where transmission method is not wide area wireless, confirms whether the IP communication is established (S908 to S910) and then only in a case where it determines that communication is possible, generates transmission data for performing the transmission instruction to the IP communication control unit 308 (S911). As confirmation of establishment of the IP communication, first, a link-up state is examined, and then it is confirmed that a data link layer of Ethernet and the like are in a state in which it can communicate (S908). In a case where it could be confirmed that a link is established, a confirmed state of the IP address is examined, and it is confirmed that a state is where communication as an IP layer is possible (S909). Finally, an error occurrence situation in a communication application layer is examined (S910), in a case where a state in which communication cannot be performed is detected in any one of the steps, error processing (S912) is performed and then the processing is ended. For the content of the error processing, storing in log information generated by the MFP 100 or displaying an error message on the operation unit 210 can be conceived, for example; however, no limitation in particular is made in the present embodiment.

When steps S908 to S910 are all satisfied, it can be determined that the IP communication is established. In such a case, the device information management unit 301, similarly to when wide area wireless is selected, based on the selection result indicated in FIG. 4C, sets the selected data type to each of the number of pieces of transmission data (N)=3, transmission data 1 to transmission data 3 (S911). It is assumed that for the type of data to be transmitted, setting values corresponding to 420 to 422 selected in FIG. 4C are stored in the device settings management unit 305 and since output processing in step S904 and subsequent steps may be the same as in a case of wide area wireless, description will be omitted. However, in a case where the processing brandies from step S911, the number of pieces of transmission data is 3 and packets according to the IP communication for the respective data are generated and then transmitted.

By providing a plurality of communication means whose communication characteristics vary via the configuration and the procedure described above and configuring them to be selectable as a transmission method of the device management information, it becomes possible to provide an environment in which the device management information is transmitted more flexibly than in the past without depending on the configuration of communication environment of the information processing apparatus.

Also, by configuring the transmission data and transmission frequency, which are suitable for the selected communication means, to be selectable, it becomes possible to perform data transmission that is suitable for the communication characteristics of the selected transmission method.

Furthermore, by configuring to perform a setting of the transmission method for remote monitoring service when initially setting a device, it is possible to join the remote monitoring service, which uses a desired transmission method, from immediately after the operation of the device is started.

Also, according to the above embodiment, data to be a transmission target is determined in accordance with the communication speed or bandwidth provided by the selected communication method. Specifically, in a case where a communication method whose communication speed is slow or the bandwidth is narrow is selected, transmission data is determined so as to include basic data whose amount of data to be a transmission target is lesser, and then is transmitted. Conversely, in a case where a communication method whose communication speed is fast or the bandwidth is wide is selected, transmission data is determined so as to include data whose amount of data to be a transmission target is larger and more detailed, and then is transmitted.

Furthermore, in addition to a transmission method, such as a LAN, whose external connection may be limited, by adding a transmission method whose limitation is lesser to the selection items, it becomes possible to transmit data without changing the communication environment such as connection limitations.

Second Embodiment

In the first embodiment, the device management information to be a transmission target and the transmission period were configured so as to be selected by the operator on the MFP 100 side regardless of which transmission method was selected. Meanwhile, in a case where the device management information is transmitted by IP communication, configuration may be taken so as to be able to set in detail on the device management server 111 side. In a case where wide area wireless communication such as LPWA is used, it is necessary to avoid making a query on the transmission data or the transmission period to device management server side in order to reduce the number of communications and the communication data amount as much as possible. Meanwhile, because the bandwidth limitation is less in the IP communication, configuration in which detailed selection can be made via a Web site provided by the device management server is desirable.

FIG. 10A and FIG. 10B are views illustrating examples of the remote monitoring service setting screen displayed on the operation unit 210 in the second embodiment. The same reference numeral will be attached and description will be omitted for things that have the same configuration as illustrated in FIG. 4A to FIG. 4C of the first embodiment.

FIG. 10A is a case where the dedicated line (wide area wireless) 403 is selected as the transmission method. In such a case, configuration is such that transmission data 1001 to 1003 and transmission periods 1004 to 1006 can be selected within the same screen, and the screen configuration is such that FIG. 4B is positioned at the bottom portion of FIG. 4A.

Meanwhile, FIG. 10B illustrates a case where HTTPS (the main line) 401 is selected as the transmission method. In such a case, the operation control unit 304 grays out all the selection items of the transmission data and the transmission periods so as not to be selectable. Also, a message that transmission data and the transmission period may be set on the device management server 111 side may be displayed in relation to the operator.

Continuing, transmission procedure of the device management information will be described; however, description will be omitted for the overall transmission flow as that may be the same as the flowchart illustrated in FIG. 7.

The device information management unit 301 described in the present embodiment performs outputting of the device management information by the procedure indicated in a flowchart in FIG. 11. In the same figure, description will be omitted for the initial setting value (S1101), the process for displaying the transmission method selection screen (S1102), and the transmission procedure in a case where the transmission setting is wide area wireless (S1103 to S1107) as they are respectively the same as steps S801, S802, and S803 to S807 in FIG. 8.

In a case where the transmission setting is HTTPS (main line) or HTTPS (sub line), steps S1111 and S1116 far acquiring from the device management server 111 the transmission data and the transmission period are added in comparison to the first embodiment.

A type of transmission data that the device information management unit 301 acquires from the device management server 111 in step S1111 may be configured such that detailed device management information, for which setting is difficult as the operation of the operation control unit 304 which is an LCD panel has become cumbersome, can be designated. For example, advanced delivery notification to be notified in a case where a predetermined remaining amount is reached for providing to an advanced delivery service, replacement completion notification which indicates when to replace consumables, and the like are given as additional items related to consumables. In addition, various device management information including consumable information such as the model numbers and serial numbers of consumables and units of the remaining amount (percentage, number of days, internal units, etc.) may be assigned as a target so long as the transmission data is of a type that is already supported by the MFP 100.

Note, since the transmission data and the transmission period are the same in the main line and the sub line in the present embodiment, only step S1111 will be described in the following. Also, since confirmation for the communication with the device management server 111 is completed in advance in step S1109, description for the error processing for when reception has failed is omitted here; however, in a case where an error is detected, the transmission data and the transmission period may be made the same as the initial setting for when wide area wireless communication is selected.

Because other processing procedures may be the same as in FIG. 8 in the first embodiment, description will be omitted.

In the present embodiment, in a case where the device management information is transmitted by IP communication, configuration in which the data type to be a transmission target and the transmission period can be set is provided on the device management server 111 side and configuration may be taken so that the MFP 100 acquires and then executes the setting value from the device management server 111. By this configuration, an environment in which detailed setting is easier to perform can be provided.

Third Embodiment

In the first embodiment and the second embodiment, configuration is such that after having selected the transmission method of the device management information, the transmission data and the transmission period, which are suitable to the selected transmission method, were selected from the selection items; conversely, configuration may be such that a transmission method is selected in accordance with the result of selecting the transmission data or the transmission period.

Hereinafter, an example of an operation screen for selecting a transmission method based on transmission data of the device management information to be transmission target will be described using FIG. 12A and FIG. 12B.

In the same figure, description will be omitted for buttons of the same configuration as in FIG. 4A to FIG. 4C. A main counter 1201 to consumable information 1206 are options for transmission data. The main counter 1201 to the remaining toner amount 1203 correspond to the main counter 410 to the remaining toner amount 412 in FIG. 4B, and the detailed counter 1204 to the consumable information 1206 correspond to the detailed counter 420 to the consumable information 422 in FIG. 4C, respectively. Also, the selection items, the HTTPS (the main line) 1207 to the dedicated line (wide area wireless) 1209, of the transmission method correspond to the selection items, the HTTPS (the main line) 401 to the dedicated line (wide area wireless) 403 in FIG. 4A, respectively.

The operation control unit 304 described in the present embodiment, in a case where only the main counter 1201 to the remaining toner amount 1203 are selected as the transmission data, controls so as to be able to select all of the HTTPS (the main line) 1207 to the dedicated line (wide area wireless) 1209 as the transmission method. A user interface in such a case is illustrated in FIG. 12A. As described above, in a case where only the main information is selected as the transmission data, no limitation is provided for the selectable transmission method. Meanwhile, as illustrated in FIG. 12B, in a case where any one of the detailed counter 1204 to the consumable information 1206 is selected as the transmission data, configuration is taken so as to control not to be able to select the dedicated line 1209 as the transmission method. In FIG. 12B, the dedicated line 1209 is displayed in a manner so as not to be selectable. As described above, in a case where any one of the detailed information is selected as the transmission data, the selectable transmission method is limited to a high-speed or wideband transmission method.

Also, in a case where the dedicated line is selected as the transmission method, it is possible to perform control in which each piece of transmission data, the detailed counter 1204 to the consumable information 1206, is grayed out so as not to be selectable. Alternatively, configuration may be taken so as to display that the dedicated line is not suitable as the transmission method and to remove the dedicated line from the selection targets when selecting.

Also, the same applies to the transmission period. For example, in a case where the transmission period whose frequency exceeds a predetermined extent is selected, configuration may be taken so as to present a user interface, in which a high-speed or wideband transmission method (e.g., the main line or the sub line) is the only selectable transmission method, in relation to the operator. For example, on the screen in FIG. 12A or FIG. 12B, a control for selecting the transmission period as in FIG. 4B or FIG. 4C is displayed. Then, if a selection item of a high frequency among them, for example, "8 hours", is selected, configuration may be taken so as to display the dedicated line (wide area wireless) 1209 as the transmission method in an unselectable manner.

By the configuration of the present embodiment, by excluding selection items which are not suitable in terms of the characteristics of a communication means based on the transmission data quantity of the device management information to be transmitted and the transmission frequency, a communication means that is suitable to the characteristics of the communication means can be selected reliably.

Fourth Embodiment

In the above-described embodiment, a configuration in which the operator selects the device management information to be a transmission target and the transmission period for the dedicated line (wide area wireless) was described. In the fourth embodiment, a mechanism for efficiently transmitting necessary data while suppressing the communication cost is further described in consideration of the communication cost of the wide area wireless and the urgency of the information to be transmitted. Note, description of the hardware configuration and the software configuration in the fourth embodiment is omitted because it is the same as the first embodiment.

Generally, in an LPWA data communication contract, a data communication amount or the number of transmissions are a fixed amount until they exceed a constant value, and when the data communication amount or the number of times data is transmitted exceeds an index value determined yearly, monthly, or the like, a charge system is often adopted in which subsequent data transmission is pay-as-you-go. In a case where an LPWA data communication is performed in such a charge system, when the data to be transmitted using an LPWA is sent without limitation, billing exceeding the fixed amount will occur and a problem in costs occur. In order to suppress the occurrence of costs due to this pay-as-you-go, it is necessary to control so as to perform communication within a limited number of times or within a size range. In view of this, in the present embodiment, in a case where the device management information is transmitted using an LPWA, which is wide area wireless, the transmission data is classified into priority transmission data and other transmission data, and transmission control according to the classification is performed.

Description regarding priority transmission data is given. An image forming apparatus vendor may provide customers with maintenance services, including delivery services for delivering consumables such as toner to customers. For the delivery service, it is necessary to deliver consumables at an appropriate time so that a situation such as not being able to print or copy because consumables are insufficient does not occur. For this reason, it is necessary for a usage state of the consumables such as the remaining toner amount to be regularly monitored. In particular, irregular event information (hereinafter tentatively referred to as a "toner LOW notification"), which shows that the remaining toner amount has become less than a specific threshold during the monitoring of the remaining toner amount, is important information that triggers the delivery of consumables such as toner and should be sent with priority. Also, in terms of handling so that a situation such as the user not being able to print or copy does not occur, device malfunction detection and alarm notification notifying that inspection is required are also important information for maintenance services. Further, there is a form in which the image forming apparatus is leased to the user and the usage fee is collected according to the print process amount as another business form of the image forming apparatus. In a case of this lease form, counter information showing a number of uses of copying, printing, and the like is information for calculating a usage fee. Accordingly, counter information required to calculate the usage fee for a fixed period such as per month is information that should be notified regularly at predetermined intervals such as once a month.

The information described above is information having a higher priority or urgency of notification compared to device management information notified other than this. In the present embodiment, the above-described information is classified as priority transmission data, and other device management information is classified into other transmission data. For the information classified into other transmission data, there is information showing, for example, the state of parts within the device (current degree of consumption, number of sheets to be fed, or the like) or what function within the image forming apparatus a user is using. Also, alerts and the like indicating a specific warning are also classified as other transmission data.

Figure 13:
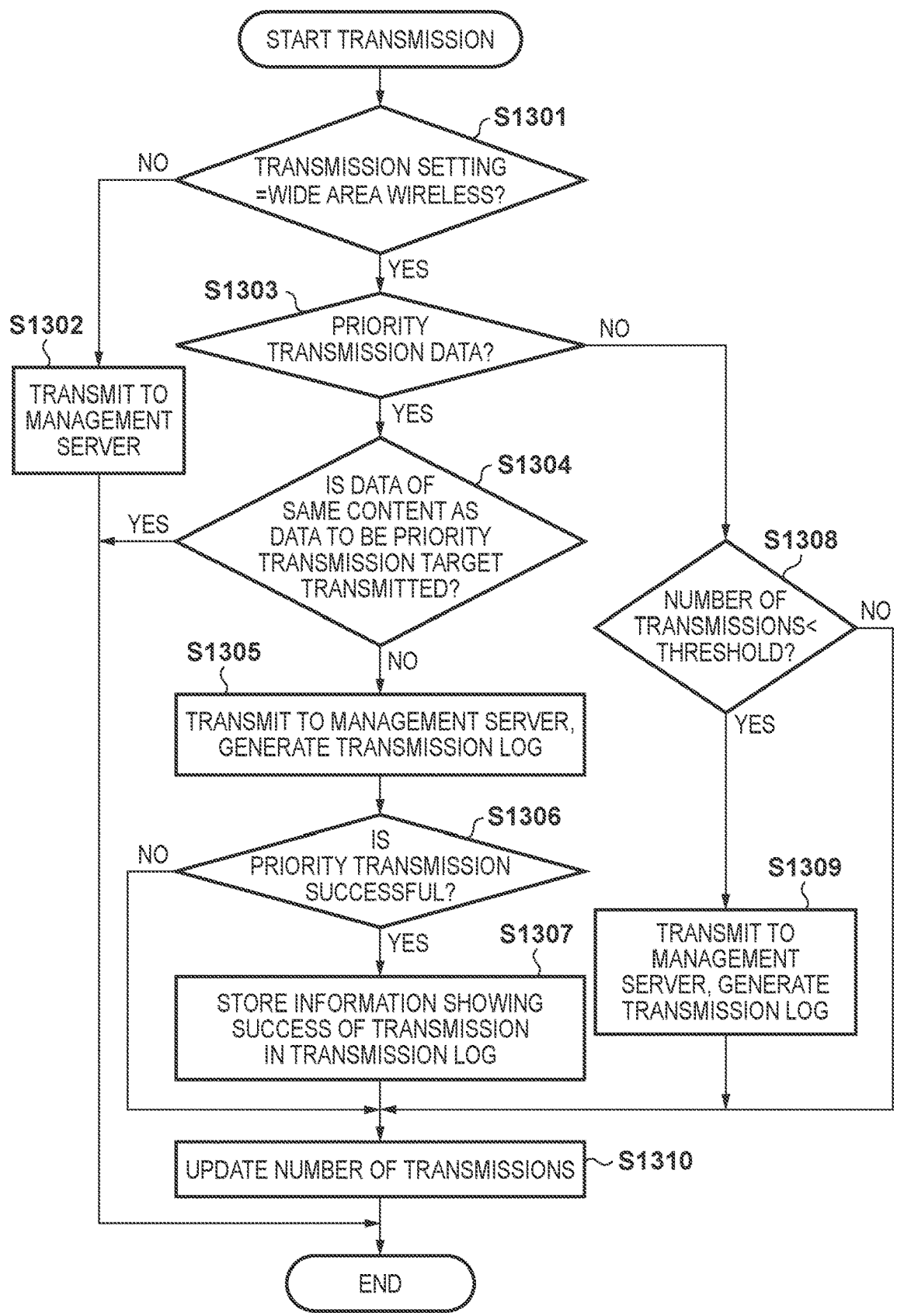
FIG. 13 is a flowchart illustrating a transmission procedure of device management information in a fourth embodiment.

In the present embodiment, when the device management information designated as the transmission target in the first to third embodiments is transmitted, a mechanism for suppressing the cost accompanying the occurrence of pay-as-you-go is provided by performing different communication control between the priority transmission data and other transmission data. A specific description is given using the flowchart of FIG. 13. Here, the processing illustrated in the flowchart of FIG. 13 is realized by the CPU 201 reading a program stored in the ROM 203 or the HDD 204 to the RAM 202 then executing it. The flowchart of FIG. 13 is executed in a case where an event for transmitting information to the management server 111 occurs, or in a case where the time for transmitting regular device management information is reached.

In step S1301, the communication I/F determination unit 303 determines whether or not the transmission setting is set to wide area wireless. In a case where the transmission setting is set to wide area wireless, the processing advances to step S1303, in a case where the transmission setting is not set to wide area wireless (in other words, in a case where the transmission setting is set to the main line or the sub line), the processing advances to step S1302. This processing is the same as the processing of step S803.

In step S1302, the device information management unit 301 generates transmission data, and transmits the generated transmission data to the management server 111 by cooperating with the IP communication control unit 308.

In step S1303, it is determined whether or not the data to be a transmission target is priority transmission data. When it is determined to be priority transmission data, the processing advances to step S1304, and when it is determined to not be priority transmission data, the processing advances to step S1308.

In step S1304, the device information management unit 301, with references to a transmission log, determines whether or not the data showing the same content as the data to be a transmission target has already been transmitted within a predetermined period. Specifically, in a case where the transmission log, in which data showing the same content as the transmission log and information indicating that the transmission was successful is stored, is recorded, the data showing the same content as the data to be a transmission target is determined to have already been transmitted within the predetermined period.

When the device information management unit 301 determines that the data showing the same content as the data to be a transmission target has already been transmitted within the predetermined period, it ends the series of processing without transmitting the data to be a transmission target. On the other hand, when the device information management unit 301 determines that the data showing the same content as the data to be a transmission target has not already been transmitted within the predetermined period, it advances the processing to step S1305. For example, a malfunction alarm notification or the like occurs may be produced many times in conjunction with the power of the device being turned ON/OFF or the like. By performing the processing of step S1304, it is possible to prevent data showing the same contents from being retransmitted.

In step S1305, the device information management unit 301 generates transmission data and cooperates with the wireless controller I/F unit 311 to transmit the generated transmission data to the wireless management cloud 110. Also, the device information management unit 301 generates a transmission log including information showing transmission content, transmission date and time, and a transmission result. At this step, information showing a blank or unknown is stored as the information showing the transmission result. The data that the wireless management cloud 110 received is transferred to the management server 111.

In step S1306, the device information management unit 301 determines whether or not the data transmission was successful. When it is determined that the data transmission was successful, the processing advances to step S1307. On the other hand, in a case where it is determined that it is unclear whether or not the data transmission was successful, the series of transmission processes ends. Specifically, the device information management unit 301 waits for a response indicating that the management server 111 has received the data within a certain period of time. In a case where a response showing that the data has been received within this certain period of time is received, it is determined that the data transmission was successful. On the other hand, in a case where no response is received even after a certain period of time has elapsed, it is determined that it is unclear whether the data transmission was successful.

In step S1307, the device information management unit 301 stores information showing success of a transmission in the transmission log cones ponding to data transmitted in step S1306. In step S1310, the device information management unit 301 updates the number of transmissions. Note, the number of transmissions is reset to zero at a timing (for example, the beginning of the month) when the data, communication amount of wide area wireless communication is reset.

On the other hand, in step S1308, the device information management unit 301 determines whether or not the number of transmissions that used wide area wireless has exceeded a threshold. When it is determined that the number of transmissions that used wide area wireless is less than or equal to the threshold, the process advances to S1309, and when it is determined that the number of transmissions that used wide area wireless exceeds the threshold, the series of transmission processing ends without transmitting the data to be a transmission target.

In step S1309, the device information management unit 301 generates transmission data and cooperates with the wireless controller I/F unit 311 to transmit the generated transmission data, to the wireless management cloud 110. Continuing on, a transmission log is generated.

Note, in the present embodiment, as one example of a method in which a transmission amount is counted and compared with a threshold, a method of counting the number of transmissions and determining whether or not the number of transmissions exceeds the threshold is exemplified. However, rather than the determination method being limited to this, configuration may be taken such that, for example, an already transmitted data size is counted and it is determined whether or not the already transmitted data size exceeds a threshold.

By the above-described procedure and configuration, efficiently transmitting necessary data while suppressing communication cost is possible. Specifically, in a case where a communications company has a contract such as flat-rate billing up to certain amount of data and pay-as-you-go once that amount is exceeded, priority transmission data can be transmitted in a range of a flat-rate data amount. Accordingly, this contributes to not only a reduction in expenses, but also ease or reliability of an estimation of expenses.

Setting of Threshold

Description is given regarding a method for selecting the threshold referenced in step S1308. The threshold of the present embodiment is selected based on the following elements 1 to 4. Element 1 is a constraint condition based on the contract system of the wide area communication service (for example, the number of transmissions and the data size falling within a range of a fixed amount). Element 2 is the number of times priority transmission data (for example, counter information) that is regularly generated occurs within a predetermined period or the data size required for transmission of the information. Element 3 is a predicted value of the occurrence frequency of event notifications that irregularly occur or the data size required for transmission of the notifications. Element 4 is a predicted value of a frequency that other transmission data occurs within the predetermined period or the data size.

For example, for element 2, in a case where there is a large amount of priority transmission data to be transmitted regularly, or in a case where the data size to be a transmission target is large, a reserved data amount that should be preferentially secured for priority transmission increases among the data set as the transmission target on the setting screens of FIG. 4B and FIG. 4C.

Also, element 3 is an element that varies depending on the frequency of use of the user and the characteristics of the device in addition to whether or not the setting transmission target is set. For example, in a case of a device with a large number of printed sheets, the reserved data amount that should be secured for the toner LOW notification becomes large. A frequency in which device malfunction alert notifications occur is predicted, for example, for each type of apparatus.

The element 4 is a value indicating how much other transmission occurs, that is, to what degree does a data communication amount, due to other data communication that is different from the priority transmission occur.

Specifically, the number of transmissions or the data size obtained by subtracting the number of transmissions and the data size that should be reserved for the priority transmission corresponding to the elements 2 and 3 from the number of transmissions and the data size of the element 1 is selected as the threshold. In other words, by setting the remaining amount, obtained by subtracting the predicted data amount to be the target of priority transmission from the upper limit data amount of the fixed amount, as the threshold referred to in step S1308, the priority transmission data is transmitted within a frame of a fixed amount. In addition to this, non-priority transmission data is also transmitted as much as possible in a flat rate and what exceeds the flat-rate frame is not transmitted. Note, it is also possible to configure such that a threshold that is obtained by further subtracting a predetermined value is selected so as to handle even a case where a notification of element 3 occurs slightly more than the predicted value. By doing so, the threshold can be set so as not to exceed the amount of data that can be transmitted in a fixed amount even if the amount of priority data increases due to fluctuations in the usage status of the user and the like.

In the present embodiment, it is assumed that the threshold for which a priority transmission can be expected to be performed without a problem under a general installation environment is appropriately selected by the operator and is set as the factory shipment value of the MFP 100. On the other hand, the above-described element 3 largely differs by use frequency. Accordingly, configuration can also be taken such that a user such as a service engineer can change the threshold. In such a case, configuration can be taken such that a user such as a service engineer selects a threshold that suits the environment. Furthermore, configuration may be taken such that the MFP 100, based on the history information, derives a predicted value indicating an anticipated amount of occurrences of the number of transmissions or data size corresponding to the element 2 and the element 3, and derives a threshold candidate based on this predicted value. The history information assumes, for example, the occurrence history of notifications or the print process amount. In such a case, the MFP 100 derives a threshold candidate by subtracting the predicted value from the number of transmissions or the data size of element 1. The MFP 100 automatically changes the threshold at the beginning of the month or the like based on the derived threshold candidate.

The threshold may be configured so that it can be changed by transmitting a change instruction from the management server 100 to the MFP 100. This change instruction may be performed by the IP communication and may also be performed by wide area wireless communication. In a case where a setting is changed by using wide area wireless communication, the management server 111 includes the threshold change instruction in the response indicating that the data has been received. Information indicating that the instruction indicates the change of the threshold and the threshold after changing the setting are included in the change instruction. The MFP 100 which received a response including a threshold change instruction performs a threshold setting change based on the change instruction. Note, in a case where wide area wireless communication supports a server push, configuration may be taken so as to perform the change instruction by a server push.

Variation

Although an example in which the transmission method and the transmission period of the device management information are set when the MFP 100 is installed is described in the above-described embodiment, there is no limitation to this. Configuration may be taken such that a setting menu is provided on a setting screen accessible by an administrator or the like or on a maintenance screen accessible by a service engineer so that a setting can be changed at any time after installation, in other words, a setting change may be accepted at any time. For example, in such a case, the transmission method and the transmission period may be inputted in the above-mentioned setting menu.

In this case, there is a case where the transmission procedure in step S702 and the subsequent steps illustrated in FIG. 7 is executed in a state (corresponding to before the execution of step S701) in which the transmission setting or the device identification ID are not yet registered. For this reason, for example, it is determined whether the transmission setting is wide area wireless in step S803 of FIG. 8, and if it is not wide area wireless (S803: No), a step in which it is checked whether the transmission setting is set to either the main line or the sub line is added prior to step S808. In a case where the transmission setting is neither the main line nor the sub line, the processing may be terminated without performing error processing. Alternatively, a process for checking the transmission setting may be added immediately before step S702, and if the transmission setting is "none", control may be taken such that processing in step S702 and the subsequent steps is not performed. Specifically, this can be realized by activating the MFP 100 without activating the process for transmitting device information.

By the configuration of the present modification example, it becomes possible to change a setting of a transmission method and a transmission period of device management information at a desired timing after installation of the MFP 100.

Also, although a case in which device management information of a printing apparatus for printing an image onto a sheet is transmitted is exemplified as one example of an information processing apparatus in the above-described embodiment, there is no limitation to this. For example, it can also be applied to the transmission of device management information of a 3D printer that models a three-dimensional modeled object using a modeling material. In this case, main total counter information such as the usage amount of a modeling material, information indicating the cumulative total number of layers, or information indicating a printing result is transmitted as the device management information to be transmitted by a dedicated line such as an LPWA. Meanwhile, in a case where the device management information is transmitted by a high-speed or wideband transmission method, it is possible to transmit, in addition to the information transmitted by the dedicated line, more detailed management information such as the usage amount of modeling materials per job, the number of stack layers per job, and the number of objects.

Summary of Embodiments and Variation

In the embodiments and variation described above, the transmission method and the transmission target data that can be transmitted by the selected transmission method are associated in advance. Then, when the transmission method or the transmission target data is selected, it becomes possible to select the transmission target data or the transmission method which is associated to the selected transmission method or the transmission target data. That is, a first transmission method and a first transmission target data are associated, and similarly, a second transmission method and a second transmission target data are associated. The same applies even when there are three or more types of the transmission method. In the present embodiment, the difference between the first transmission method and the second transmission method is apparent in the communication speed or the bandwidth. The difference is also apparent in the power consumption. The transmission target data is associated with transmission method based on those differences.

Accordingly, the transmission target data that can be transmitted by the first transmission method and the second transmission method, respectively, is determined in accordance with mainly, its size. For example, data that can be transmitted by the slower transmission method can also be transmitted, without a problem, by the faster transmission method. Accordingly, the transmission target data associated with respective transmission methods have an inclusive relationship, and there is data that can be transmitted by a faster transmission method but is not permitted to be transmitted by a slower transmission method.

By doing as described above, it becomes possible to select a plurality of transmission methods, whose communication characteristic vary, and transmission target data suitable for respective transmission methods and to provide an environment in which the device management information is flexibly transmitted.

Also, in the fourth embodiment, in addition to control of the first to third embodiments, it is possible to provide an environment in which device information whose degree of priority or urgency is high is reliably transmitted while suppressing data communication cost in the second communication method.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-043335, filed Mar. 12, 2020 and Japanese Patent Application No. 2020-203657, filed Dec. 8, 2020 which are hereby incorporated by reference herein in their entirety.

What is claimed is:

1. An information processing apparatus for transmitting, to an external apparatus, device management information, the apparatus comprising:
   at least one memory that stores a set of instructions;
   at least one processor that executes the instructions;
   a first communication unit configured to, in relation to an external apparatus identified by an IP address on a network, perform communication that uses the IP address; and
   a second communication unit configured to communicate with an external apparatus by a communication method that is different from a communication method used by the first communication unit;
   wherein the instructions, when executed, cause the information processing apparatus to perform operations comprising:
   a selection of either the first communication unit or the second communication unit as a communication unit used to transmit the device management information,
   wherein in a case where the second communication unit is selected as the communication unit used to transmit the device management information, among a plurality of types of management information that can be transmitted to an external apparatus in a case where the first communication unit is selected, a subset of the types of management information can be transmitted to an external apparatus.

2. The information processing apparatus according to claim 1, wherein the second communication unit is a communication unit that communicates with an external apparatus by wireless communication based on an LPWA (Low Power Wide Area) standard.

3. The information processing apparatus according to claim 2, wherein the wireless communication based on the LPWA standard is wireless communication based on any one of SigFox (registered trademark), LoRaWAN (registered trademark), and NB-IoT (registered trademark) standards.

4. The information processing apparatus according to claim 1, wherein a bandwidth of a communication channel for when communicating using the second communication unit is narrower in comparison to a bandwidth of a communication channel for when communicating using the first communication unit.

5. The information processing apparatus according to claim 4,
   wherein the instructions further include an instruction for causing the information processing apparatus to perform:
   receiving a selection of device management information to be a transmission target from among one or more pieces of device management information associated with the communication unit selected as the communication unit to use to transmit the device management information,
   wherein, in a case where the second communication unit is selected as the communication unit to use to transmit the device management information, fewer types of device management information can be selected as a transmission target in comparison to a case where the first communication unit is selected.

6. The information processing apparatus according to claim 1,
wherein the instructions further include an instruction for causing the information processing apparatus to perform:
resetting an operation setting set by the information processing apparatus and resetting to an initial state the information processing apparatus,
wherein as one process of initial setup processing executed when the information processing apparatus is activated in the initial state, processing for selection of a communication unit to use to transmit the device management information is performed.

7. The information processing apparatus according to claim 1, further comprising:
a display unit configured to, in a case where a predetermined user operation is received, display a setting screen for performing a selection of a communication unit to use to transmit the device management information,
wherein a communication unit selected as a communication unit to use to transmit the device management information by a user operation via the setting screen is selected as a communication unit to use to transmit the device management information.

8. The information processing apparatus according to claim 1,
wherein the instructions further include an instruction for causing the information processing apparatus to perform:
receiving a selection of a transmission period for transmitting the device management information,
wherein an interval of the shortest period that can be selected as a transmission period in a case where the second communication unit is selected as the communication unit to use to transmit the device management information is longer in comparison to an interval of the shortest period that can be selected in a case where the first communication unit is selected.

9. The information processing apparatus according to claim 1, wherein the information processing apparatus is a printing apparatus and management information that can be transmitted in a case where the second communication unit is selected includes information that indicates at least a print process amount.

10. The information processing apparatus according to claim 9, further comprising:
a print unit configured to print an output article based on print data received from an external terminal on a network via the first communication unit.

11. An information processing apparatus according to claim 10, wherein the print unit prints an image onto a sheet and the information that indicates the print process amount is counter information that indicates the number of sheets for which printing was performed.

12. The information processing apparatus according to claim 10, wherein the print unit is a 3D printer that models a three-dimensional modeled object based on print data and the information that indicates the print process amount is information that indicates a usage amount of a modeling material.

13. The information processing apparatus according to claim 1,
wherein the instructions further include an instruction for causing the information processing apparatus to perform:
in a case where the second communication unit is selected as a communication unit to use to transmit the device management information and in a case where an event in which management information needs to be transmitted has occurred, determining whether or not management information to be a transmission target is management information that needs to be preferentially transmitted; and
in a case where the management information to be the transmission target is determined not to be management information that needs to be preferentially transmitted, determining whether or not a result of data transmission executed within a predetermined period by the second communication unit has exceeded a threshold,
wherein in a case where the result of data transmission is determined to have exceeded the threshold, the information processing apparatus, even in a case where the event has occurred, does not transmit, to an external apparatus, the management information to be the transmission target.

14. The information processing apparatus according to claim 13, wherein in a case where the management information to be the transmission target is determined to be management information that needs to be preferentially transmitted, regardless of whether or not a result of data transmission executed within a predetermined period has exceeded a threshold, the management information to be the transmission target is transmitted to an external apparatus by the second communication unit.

15. The information processing apparatus according to claim 13,
wherein the instructions further include an instruction for causing the information processing apparatus to perform:
changing the threshold.

16. The information processing apparatus according to claim 13,
wherein the instructions further include an instruction for causing the information processing apparatus to perform:
predicting, based on history information, traffic of data transmission of management information that needs to be preferentially transmitted; and
deriving the threshold based on the predicted traffic and a constraint condition related to data traffic in the second communication unit.

17. A non-transitory computer readable medium, wherein a program stored in the medium causes a computer, operable to perform a first communication, in relation to an external apparatus identified by an IP address on a network, that uses the IP address and to perform a second communication with an external apparatus using a communication method that is different from a communication method used by the first communication, to perform:
receiving a selection of either the first communication or the second communication as a communication used to transmit the device management information,
wherein in a case where the second communication is selected as the communication to use to transmit the management information, among a plurality of types of management information that can be externally transmitted in a case where the first communication is selected, a portion of the types of management information can be externally transmitted.

18. A control method of an information processing apparatus operable to externally transmit device management information, the method comprising:
performing a first communication, in relation to an external apparatus identified by an IP address on a network, that uses the IP address;
performing a second communication with an external apparatus using a communication method that is different from a communication method used by the first communication;
receiving a selection of either the first communication or the second communication as a communication used to transmit the device management information,
wherein in a case where the second communication is selected as the communication to use to transmit the device management information, among a plurality of types of management information that can be externally transmitted in a case where the first communication is selected, a portion of the types of management information can be externally transmitted.

* * * * *